(12) United States Patent
Maliverney et al.

(10) Patent No.: US 9,744,527 B2
(45) Date of Patent: Aug. 29, 2017

(54) ARTICLE HAVING ANTIFOULING PROPERTIES FOR AQUATIC AND PARTICULARLY SEA USE

(75) Inventors: Christian Maliverney, Saint Julien sur Bibost (FR); Stefan Breunig, Villette de Vienne (FR); Delphine Blanc, Lyons (FR)

(73) Assignee: BLUESTAR SILICONES FRANCE SAS (FR)

( * ) Notice: Subject to any disclaimer, the term of this patent is extended or adjusted under 35 U.S.C. 154(b) by 799 days.

(21) Appl. No.: 12/994,428

(22) PCT Filed: May 28, 2009

(86) PCT No.: PCT/FR2009/000620
§ 371 (c)(1),
(2), (4) Date: May 10, 2011

(87) PCT Pub. No.: WO2009/156608
PCT Pub. Date: Dec. 30, 2009

(65) Prior Publication Data
US 2011/0206936 A1     Aug. 25, 2011

(30) Foreign Application Priority Data
May 29, 2008 (FR) ..................... 08 02913

(51) Int. Cl.
B32B 27/00 (2006.01)
B01J 31/02 (2006.01)
C09D 5/16 (2006.01)
C09D 183/08 (2006.01)

(52) U.S. Cl.
CPC ....... B01J 31/0251 (2013.01); B01J 31/0274 (2013.01); B01J 31/0275 (2013.01); C09D 5/1675 (2013.01); C09D 5/1687 (2013.01); C09D 5/1693 (2013.01); C09D 183/08 (2013.01); *Y10T 428/31663* (2015.04)

(58) Field of Classification Search
None
See application file for complete search history.

(56) References Cited

U.S. PATENT DOCUMENTS

| 3,702,778 | A |   | 11/1972 | Mueller et al. |
|---|---|---|---|---|
| 4,021,392 | A |   | 5/1977 | Milne et al. |
| 4,025,693 | A |   | 5/1977 | Milne |
| 4,248,992 | A | * | 2/1981 | Takago ........................... 528/28 |
| 4,248,993 | A |   | 2/1981 | Takago |
| 4,515,932 | A |   | 5/1985 | Chung |
| 4,528,353 | A |   | 7/1985 | Lucas et al. |
| 4,563,498 | A |   | 1/1986 | Lucas |
| 5,218,059 | A | * | 6/1993 | Kishihara et al. ............ 525/477 |
| 5,519,104 | A |   | 5/1996 | Lucas |
| 2007/0135602 | A1 | * | 6/2007 | Yamahiro et al. ............ 526/242 |
| 2009/0182091 | A1 | * | 7/2009 | Noro et al. .................... 524/588 |
| 2012/0135244 | A1 | * | 5/2012 | Yuki et al. .................... 428/414 |

FOREIGN PATENT DOCUMENTS

| CA | 991929 | 6/1976 |  |
|---|---|---|---|
| CA | 1260186 | 9/1989 |  |
| EP | 0051930 | 5/1982 |  |
| EP | 802236 A1 * | 10/1997 | ............. C08L 86/06 |
| EP | 0885933 | 12/1998 |  |
| FR | 2083029 | 10/1971 |  |
| FR | 2083029 A5 | 12/1971 |  |
| FR | 2266733 | 10/1975 |  |
| FR | 2375305 | 7/1978 |  |
| FR | 2557582 | 7/1985 |  |
| FR | 2557585 | 7/1985 |  |
| FR | 2786497 A1 | 6/2000 |  |
| GB | 1581727 | 12/1980 |  |
| GB | 2118196 | 10/1983 |  |
| JP | 2002348536 A * | 12/2002 | ........... C09D 183/10 |
| WO | 2004/020525 | 3/2004 |  |
| WO | WO 2007094272 A1 * | 8/2007 | ............... C09K 3/10 |

OTHER PUBLICATIONS

"Preparation of Guanidine Bases Immobilized on SBA-15 Mesoporous Material and Their Catalytic Activity in Knoevenagel Condensation", Kim et al. Studies in Surface Science and Catalysis, vol. 146 p. 505-508 (2003).*
JP 2002348536 A, English Machine Translation retrieved from JPO website (2002).*
CAS Registry No. 88248 67 3 SciFinder from American Chemical Society (ACS) (2015).*
CAS Registry No. 69709 01 9 SciFinder from American Chemical Society (ACS) (2015).*

* cited by examiner

*Primary Examiner* — Kenneth Stachel
(74) *Attorney, Agent, or Firm* — McBee Moore Woodward & Vanik IP, LLC

(57) ABSTRACT

An article having antifouling properties and intended to be employed in aquatic uses, in particular marine uses, which comprises: a) a support, b) optionally, at least one primer coat on said support comprising at least one anticorrosive product, c) optionally, at least one intermediate primer coat promoting adhesion between the coats, d) at least one adhesion-promoting coat or tie coat, deposited on said primer coat or on said support when the primer coat is absent, and e) at least one antifouling coat or topcoat, deposited on said adhesion-promoting coat or tie coat.

16 Claims, No Drawings

ARTICLE HAVING ANTIFOULING PROPERTIES FOR AQUATIC AND PARTICULARLY SEA USE

CROSS REFERENCE TO RELATED APPLICATIONS

This application is a §371 National Stage Application of PCT/FR2009/000620 filed May 28, 2009, which claims priority to French Application No. 08/02913 filed May 29, 2008.

BACKGROUND OF THE INVENTION

Field of the Invention

The present invention relates to an article having antifouling properties and intended to be employed in aquatic uses, in particular marine uses, and also to a method for delaying the growth of aquatic organisms on submersible or semi-submersible structures.

The invention relates to the field of antifouling marine paints. Antifouling marine paints are topcoats intended to prevent the attachment of animals or plants to the lower parts of the hull of ships. They are used for reasons of safety, maintaining the maneuverability of ships, reducing fuel consumption, combating corrosion and weighing-down of structures.

Description of Related Art

The problem of "biofouling" constitutes a major problem resulting from the immersion of materials in marine environments. The prevention of this phenomenon represents a considerable maintenance cost.

Specifically, the formation of "biofouling" or "fouling" occurs during immersion in seawater, where a layer of organic and inorganic molecules is adsorbed to the surface of the material extremely rapidly. This layer of adsorbed material, or biofilm, serves as a mediator for the adhesion of the bacteria present in suspension in the marine environment.

This colonization of the surface by marine bacteria is rapid and a stationary state is reached after a period of a few hours to a few days. Finally, other marine organisms colonize the surface, the adherent bacteria recruiting these other organisms. All these live organisms attached to the surface constitute the biofouling or fouling.

The adhesion of marine fouling concerns any structure immersed in the sea: ships, pipelines, cooling towers and circuits, harbor structures, marine sensors, aquaculture systems, etc. The damage caused is considerable and diverse. Specifically, the structures become coated, for example, with organisms which have a negative effect on the performance levels of the structures.

In particular, for the hulls of ships, the incrustation of various marine organisms increases the friction between the ships' hulls and the seawater, which reduces the speed and can lead to greater fuel consumption. Thus, the bottom of a ship which is not protected by an antifouling system can, after less than six months spent at sea, be covered with 150 kg of fouling per square meter.

In order to avoid this economic loss, and also in order to more successfully inhibit corrosion phenomena, antifouling paints, the objective of which is to prevent or notably reduce the soiling due to the incrustations of marine organisms, are applied to the immersed parts of the structures exposed to water. The principle of antifouling paints is based on the controlled release of the active substance at the interface between the surface and the seawater. The effectiveness of the paint is maintained as long as the concentration of active substance released at the surface is effective and regular. Most antifouling paints therefore contain a biocidal product which is most commonly an organometallic compound (based on tin, on copper or on zinc) or an organic compound (fungicide, algicide, bactericide) which prevents adhesion of the marine soiling owing to the toxic activity thereof.

However, the problem associated with the use of these paints is that they release into the marine environment substances that are harmful to the maritime fauna and flora. In addition, the coatings become increasingly rough and gradually degrade, which increases fuel consumption and increases the hydrodynamic noise emitted by the immersed structure.

This new difficulty has been solved by using self-polishing antifouling paints. In addition to having biocidal agents, these paints exhibit, under the action of surface hydrolysis by the seawater and that of erosion due to the movement of the ship, a regular and controlled loss of thickness over time. The slow erosion of the coating in contact with the seawater makes it possible to constantly refresh the surface with biodical agents.

The self-polishing antifouling paints developed since the 1960s were based on tin salts. They were self-polishing paints formulated from tributyltin (TBT) methacrylate copolymers which have a constant degree of leaching. The TBT grafted to an acrylic binder is released slowly by hydrolysis in water. Examples of this type of paint are described in documents FR-A-2266733, FR-A-2557585, EP-A-0051930 and GB-A-2118196.

Tributyltin (TBT), which is very effective, was therefore the biocide most commonly used in antifouling paints, but this product, its degradation molecules and its metabolites proved to be seriously and sustainably polluting. For these reasons, the International Maritime Organization prohibited the use of tin-based antifouling paints.

The antifouling paints used today are mainly based on copper-containing compounds and/or on synthetic chemical compounds, but also based on silicone polymers.

With regards to the copper-based paints, although they are less toxic than tin salts, they are virtually always formulated with a massive proportion of cuprous oxide (see, for example, document EP-A-051930 or FR-A-2557585), the main binder being based on special polymers generally of the acrylic type. However, they are effective only against the marine fauna, and, in order to combat the growth of algae, it is essential to add herbicides, which can pose new threats to the environment.

This alternative does not therefore provide a sustainable solution for protecting the environment against the considerable discarding of heavy ions, in particular copper ions, following the intensive use of paints which are tin-free but are rich in copper.

Another solution for preventing the soiling of the surfaces of structures in contact with seawater consists in covering these surfaces with at least one protective coating, the external layer of the coating in contact with the water being a silicone elastomer. These coatings are prepared using paints known as "fouling-release coating". The principle of these new antifouling paints is to create a very smooth surface, with a low surface energy, to which the organisms have great difficulty in adhering. When such surfaces are stationary, marine organisms can deposit themselves thereon. However, by virtue of the flexibility and of the low surface tension of the silicone-based topcoat, these organisms are quite simply removed by the force of the movement of the water or the effect of friction caused by the movement of the ship. This also means that, if there is sufficient movement of water around the hull of a ship, a natural self-cleaning effect occurs.

By virtue of these properties, even ships which are less frequently at sea or in waters with less movement benefit from cleaning intervals which are more spaced out. This is due to the fact that the marine organisms have trouble adhering to the surface; which also makes the cleaning easier.

These silicone-based paints forming an antifouling coating are therefore very innovative:
 they are completely friendly to the marine environment: no metal waste, and
 they improve the glide of ships, thus reducing by 1 to 5% their fuel consumption and therefore their greenhouse gas emissions.

There are many patents, for example patents FR-A-2 083 029 and U.S. Pat. No. 3,702,778, describing such coatings of which the topcoat is a hot-cured or cold-cured silicone elastomer.

For example, U.S. patent application Ser. No. 07/847,401, filed on Mar. 6, 1992, describes a three-component antifouling system comprising at least one epoxy primer coat, one adhesion primer coat (tie coat) and one antifouling coat (topcoat) based on a silicone elastomer. The final epoxy primer coat is normally a thin coat which is applied in order to obtain a clean and fresh surface to which the tie coat can adhere. The tie coat comprises an organopolysiloxane and a curing component. The antifouling coat comprises an organopolysiloxane, an alkyl silicate, a curing agent and a tin-based catalyst. The epoxy primer coat(s) is (are) applied directly to the support. The tie coat is applied to the epoxy primer coat(s). The antifouling coat, as a silicone coating, is then applied and crosslinked on the tie coat, after partial curing of the latter.

An antifouling coat (topcoat) based on a silicone elastomer can also comprise exuding compounds which improve the "antifouling" effect, in particular:
 methylphenylpolysiloxane oils (U.S. Pat. No. 4,025,693),
 a hydrocarbon-based liquid compound, for example a polyolefin,
 a plasticizer,
 a lubricating oil (FR-A-2 375 305),
 liquid paraffins and waxy masses of the petrolatum type (JP-A-83/013 673),
 a thermoplastic polymer such as PVC,
 a vinyl chloride/vinyl acetate copolymer (Kokai JP-A-79/026 826), or
 cationic, anionic, nonionic or amphoteric surfactants (JP-A-85/258 271).

In order to form the silicone elastomer coating, the silicone formulations used generally involve a silicone oil, generally a reactive polydimethylsiloxane with hydroxylated endings, which optionally prefunctionalize with a silane so as to have alkoxy ends, a crosslinking agent and a polycondensation catalyst, conventionally a tin salt or an alkyl titanate, a reinforcing filler and optional other additives, such as bulking fillers, adhesion promoters, dyes, etc.

These room-temperature vulcanizing organopolysiloxane compositions are well known and are classified in 2 distinct groups: single-component compositions (RTV-1) and two-component compositions (RTV-2). The term "RTV" is the acronym for "room-temperature vulcanizing".

During crosslinking, water (either provided by atmospheric moisture in the case of RTV-1 compositions, or introduced into one part of the composition in the case of RTV-2 compositions) enables the polycondensation reaction, which results in the formation of the elastomeric network.

Generally, single-component (RTV-1) compositions crosslink when they are exposed to moisture from the air, i.e. they cannot crosslink in an enclosed medium. For example, the single-component silicone compositions cold-crosslink according to a mechanism of hydrolysis of reactive functions of the acetoxysilane, ketiminoxysilane, alkoxysilane, etc., type, followed by condensation reactions between silanol groups formed and other residual reactive functions. The hydrolysis is generally carried out by virtue of the water vapor which diffuses into the material from the surface exposed to the atmosphere. Generally, the kinetics of the polycondensation reactions are extremely slow; these reactions are therefore catalyzed by a suitable catalyst. As catalysts which are used, use is most commonly made of catalysts based on tin, on titanium, on an amine or compositions of these catalysts. Catalysts based on tin (cf. in particular FR-A-2 557 582) and on titanium (cf. in particular FR-A-2 786 497) are catalysts that are very effective. Single-component silicone elastomers with —Si(OR) ends are sometimes referred to as alkoxy elastomers.

As regards two-component compositions, they are sold and stored in the form of two components, a first component containing the base polymer materials and the second component containing the catalyst. The two components are mixed at the time of use and the mixture crosslinks in the form of a relatively hard elastomer. These two-component compositions are well known and are in particular described in the book by Walter Noll "Chemistry and Technology of Silicones" 1968, $2^{nd}$ edition, on pages 395 to 398.

These compositions essentially comprise 4 different ingredients:
 a reactive α,ω-dihydroxydiorganopolysiloxane polymer,
 a crosslinking agent, generally a silane, a silicate or a polysilicate,
 a tin catalyst, and
 water.

Most commonly, the condensation catalyst is based on an organic tin compound. Specifically, many tin-based catalysts have already been proposed as crosslinking catalysts for these RTV-1 or RTV-2 compositions. Conventional polycondensation catalysts comprise dialkyltin compounds, in particular dialkyltin dicarboxylates such as dibutyltin dilaurate and dibutyltin diacetate, alkyl titanate compounds, such as tetrabutyl titanate or tetraisopropyl titanate, or titanium chelates (EP-A-0 885 933, U.S. Pat. No. 5,519,104, U.S. Pat. No. 4,515,932, U.S. Pat. No. 4,563,498, U.S. Pat. No. 4,528,353).

However, the alkyltin-based catalysts, although they are very effective, most commonly colorless, liquid and soluble in silicone oils, have the drawback of being toxic (CMR2 toxic for reproduction).

According to another approach, catalysts of the silicone polycondensation reaction, which have a guanidine structure, such as tetramethylguanidine, described in international patent application WO 2004/020525, have been described. Other catalysts with a silylated guanidine structure have also been developed and are described, for example, in U.S. Pat. No. 4,248,993. Although these applications do not describe antifouling paints, it should be noted that the problem associated with the use of these organic catalysts is that they must be used in the presence of specific crosslinking agents that are very reactive and expensive (silanes comprising 1-methylvinyloxy functions), i.e. conventional crosslinking agents of simple structures, which are very widely used in single-component or two-component RTV formulations, for instance alkyl trialkoxysilanes, alkyl silicates or alkyl polysilicates, cannot be combined with them without the obligatory presence of a very reactive crosslinking agent such as a silane comprising 1-methylvinyloxy functions. This is because, without the presence of this very reactive silane, the crosslinking of the composition to give an elastomer is insufficient and does not make it possible to obtain good mechanical properties. Thus, when the derivative 1,1,3,3-trimethylguanidine is used with a conventional crosslinking agent, for instance an alkyl polysilicate, and without the presence of a specific reactive silane comprising a methylvinyloxy function, the crosslinking of the system is then insufficient and cannot generate a silicone elastomer.

In antifouling uses involving large amounts of paints, this problem is totally unacceptable owing to the increased cost caused by the use of a very reactive, expensive specific crosslinking agent which offers the final user little flexibility.

For sustainable development, it therefore appears to be necessary to develop novel antifouling paints which do not comprise any toxic catalysts. In addition, these catalysts should be usable irrespective of the type of crosslinking agent used and thus allow the use of crosslinking agents which are more health-and-safety friendly.

For example, an important characteristic of a curable silicone composition is the crosslinking kinetics. The time needed to obtain a dry surface (or Tack Free Time) must be short. Tack Free Times of less than one hour are generally required.

Another important characteristic of a curable silicone composition is the working time (pot-life), i.e. the time during which the composition can be used after mixing without curing. This time must be sufficiently long to allow its use, but sufficiently short to obtain a hard coating. For example, for a coating of tie coat or topcoat type, a pot-life of more than 1 hour is generally required when the external temperature is between 20 and 30° C. Now, one of the means for adjusting this pot-life is the nature of the components used, such as the catalyst.

For all these reasons, novel strategies for combating the adhesion of aquatic fouling, and in particular marine fouling, are being developed today.

SUMMARY OF THE INVENTION

The objective of the invention is to propose an article having antifouling properties by means of coatings obtained using antifouling paints comprising no prohibited components (biocide or catalyst) and containing no tin.

The present invention therefore relates to an article having antifouling properties and intended to be employed in aquatic uses, in particular marine uses, which comprises
a) a support,
b) optionally, at least one primer coat on said support comprising at least one anticorrosive product,
c) optionally, at least one intermediate coat promoting adhesion between the coats,
d) at least one adhesion-promoting coat or "tie coat", deposited on said primer coat or on said support when the primer coat is absent, and
e) at least one antifouling coat or "topcoat", deposited on said adhesion-promoting coat or tie coat,
said article being characterized in that the antifouling coat and/or the tie coat is/are prepared from a curable polyorganosiloxane composition R containing no metal catalyst, and characterized in that it comprises, firstly, a silicone base B capable of curing by means of a polycondensation reaction so as to give a silicone elastomer and, secondly, a catalytically effective amount of at least one polycondensation catalyst A which is a silylated organic compound, and which corresponds to general formula (I):

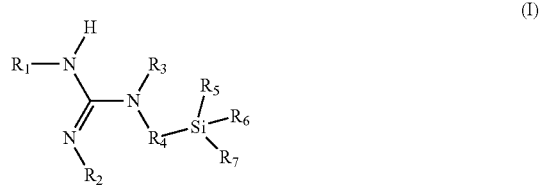

in which:
$R_1$ and $R_2$, which may be identical or different, represent, independently of one another, a linear or branched, monovalent alkyl group, a cycloalkyl group, or a (cycloalkyl)alkyl group, the ring being substituted or unsubstituted and possibly comprising at least one heteroatom, an arylalkyl group, a fluoroalkyl group or an aryl group, which is substituted or unsubstituted, or $R_{11}R_{12}R_{13}Si$, in which $R_{11}$, $R_{12}$ and $R_{13}$ are linear or branched monovalent alkyl groups, $R_3$ represents a hydrogen atom, a linear or branched, monovalent alkyl group, a cycloalkyl group, an alkyl group substituted with a ring, which is substituted or unsubstituted and which may comprise at least one heteroatom, an arylalkyl group, a fluoroalkyl group, an alkylamine group, an alkylguanidine group or an aryl group, which is substituted or unsubstituted, or an alkylalkoxysilane, $R_4$ represents a linear or branched alkyl chain containing 1 to 50 atoms, preferably 1 to 20, it being possible for some to be heteroatoms chosen from O, S and N, $R_5$, $R_6$ and $R_7$, which may be identical or different, represent, independently of one another, a linear or branched alkyl group, an aromatic group, an alkoxy group or a trialkylsilyloxy group of formula (I') below:

R, R' and R", which may be identical or different, representing, independently of one another, a linear or branched $C_1$-$C_{12}$ alkyl group or an aromatic group,
with the condition that, if $R_3$ is a hydrogen atom, then neither $R_1$ nor $R_2$ is a linear monovalent hydrocarbon-based group.

DETAILED DESCRIPTION OF A PREFERRED EMBODIMENT

In order to achieve this objective, the applicant has, to its credit, demonstrated, entirely surprisingly and unexpectedly, that the silylated organic compounds corresponding to general formula (I) which are tri- or tetrasubstituted silylated guanidines make it possible to prepare coatings which are useful as a tie coat or topcoat in antifouling uses. The coatings obtained according to the invention have noteworthy adhesion properties on the supports thus treated while at the same time conferring a very smooth treated surface, with a low surface energy, to which the organisms have great difficulty in adhering.

It is also to the credit of the inventors to have overcome the technical prejudice, as taught, for example, by international application WO 2004/020525, which, until then, would have it that structurally similar catalysts, such as 1,3-diphenylguanidine, 1,3-di-o-tolylguanidine, 1,3-dimethylguanidine or 1,1,3,3-tetramethylguanidine, had to be combined with very reactive and expensive specific crosslinking agents (silanes comprising 1-methylvinyloxy functions), in order to crosslink RTV formulations.

The silylated compounds according to the invention corresponding to general formula (I) are guanidine's which are particularly easy to obtain and perform particularly well as catalysts. They have the advantage of being liquid, colorless, odorless and soluble in silicone matrices used in antifouling applications. In addition, the silylated guanidines according to the invention are used in the silicone systems to be crosslinked at very low contents, and make it possible, according to the content, to adapt the pot-life while at the same time guaranteeing excellent results with the elastomers obtained.

It is interesting to note that, in addition to the ecological advantages (absence of tin and of copper), the use of a curable polyorganosiloxane composition R containing no metal catalyst according to the invention makes it possible to prepare paints which can be in various colors, including white, by virtue of the absence of copper oxide.

Any material which is used in an aquatic environment and which is subject to soiling can be a support for the present invention. Possible supports are materials for constructing boats, such as stainless steel, aluminum, wood, glass fibers impregnated with resin and any other composite material. The materials used for canalizations, such as concrete, plastics, steel and iron and other metals can also be coated. Pools containing water, including swimming pools, are subject to soiling. The materials used for manufacturing pools are identical or similar to those used for manufacturing canalizations.

The support may or may not be coated with a primer coat comprising at least one anticorrosive product. This anticorrosive coat contains an anticorrosive product, which can be any product that inhibits corrosion or degradation of the support subsequent to a reaction with its environment. Such anticorrosive products are well known in the art. They are in two-component form, comprising a base product with an epoxy function and a curing catalyst. The anticorrosive coat normally has a thickness of from 0.10 to 0.75 nm.

The intermediate primer coat promoting adhesion between the coats can be prepared from known and/or commercial products. Generally, they are prepared from a two-component product based on epoxy-amine systems and known to those skilled in the art.

Examples of compositions for preparing an anticorrosive coat or an intermediate adhesion-promoting primer coat are described in the handbook "Protective Coatings, Fundamentals of Chemistry and Composition", by C. H. Hare, published by Technology Publishing Company, Pittsburgh, 1994.

Each of the coats of the article according to the invention can be applied by processes well known in the art. Such processes comprise application with a brush, spraying, dipping, application with a roller, or any process normally used for applying a paint. In addition, the various coats of the article according to the invention are dried according to the usual practices in this art.

When an antifouling coat (or topcoat) according to the invention is used, it can be combined with an adhesion-promoting coat (or tie coat) of diverse and varied nature. When the adhesion-promoting coat (or tie coat) is not prepared from a composition according to the invention, then this undercoat may be of diverse and varied nature. For example, it can be made of polyurethane, of natural or synthetic rubber which is optionally chlorinated, such as chloroprene and neoprene, or of butyral/silicone rubber (Kokai JP-A-78/137 231, JP-A-78/137 233 and JP-A-78/137 234). According to another approach, for example described in patent U.S. Pat. No. 5,449,553, a tie coat is described and is prepared from an air-moisture-curable composition comprising a tin-based polycondensation catalyst, a crosslinking agent such as ethyl silicate and a copolymer derived from the product of reacting an organopolysiloxane with a silylhydroxy ending with a polymerizable monomer such as a styrene or a conjugated diolefin, for instance 1,3-butadiene. According to another example, described in patent EP-1670866, a tie coat is formed from a composition comprising:

(i) from 0 to 60% by wet weight of pigments and of fillers; and (ii) the rest being made up of a binder-based phase comprising:

from 1% to 90% by wet weight of one or more polysiloxanes comprising an amine function, from 1% to 90% by wet weight of one or more polysiloxanes comprising an epoxy function, and from 0 to 20% by wet weight of an adhesion promoter chosen from the group consisting of polysiloxanes comprising a hydroxyl function, polysiloxanes comprising a hydroxyalkyl function and polysiloxanes comprising a $C_1$-$C_4$ alkoxy function.

Other examples of conventional tie coats are described in patent U.S. Pat. No. 4,861,670.

According to one preferred embodiment, the polycondensation catalyst A is a silylated organic compound chosen from the group consisting of the following compounds (1) to (54):

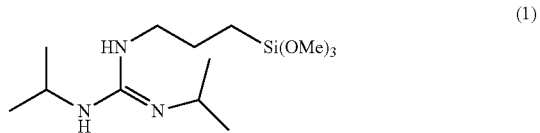

(1)

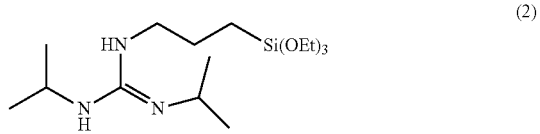

(2)

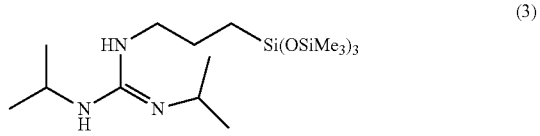

(3)

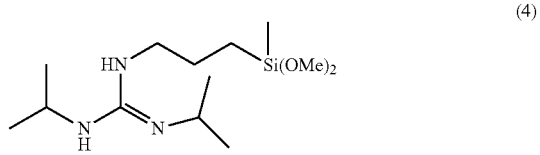

(4)

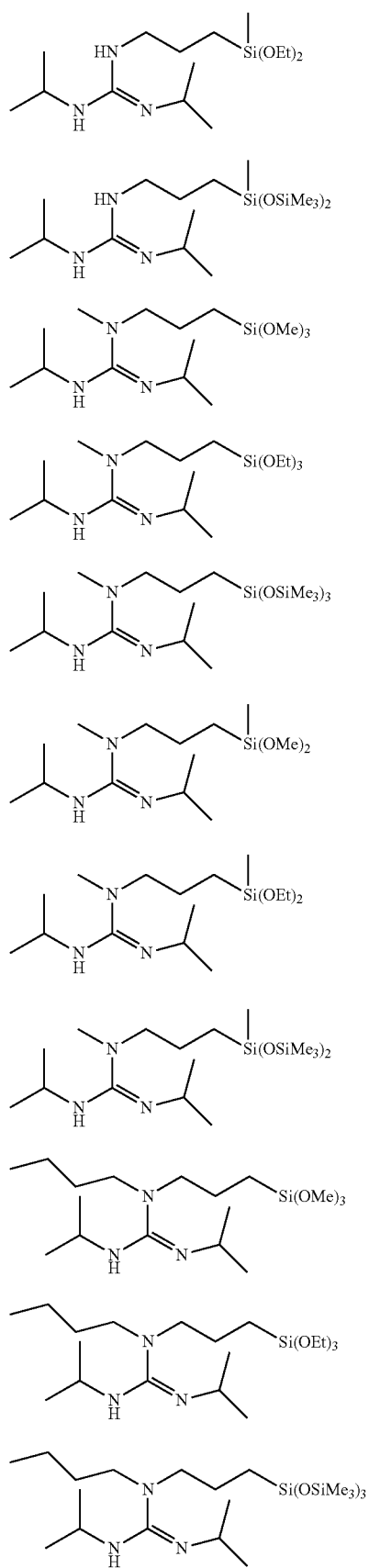
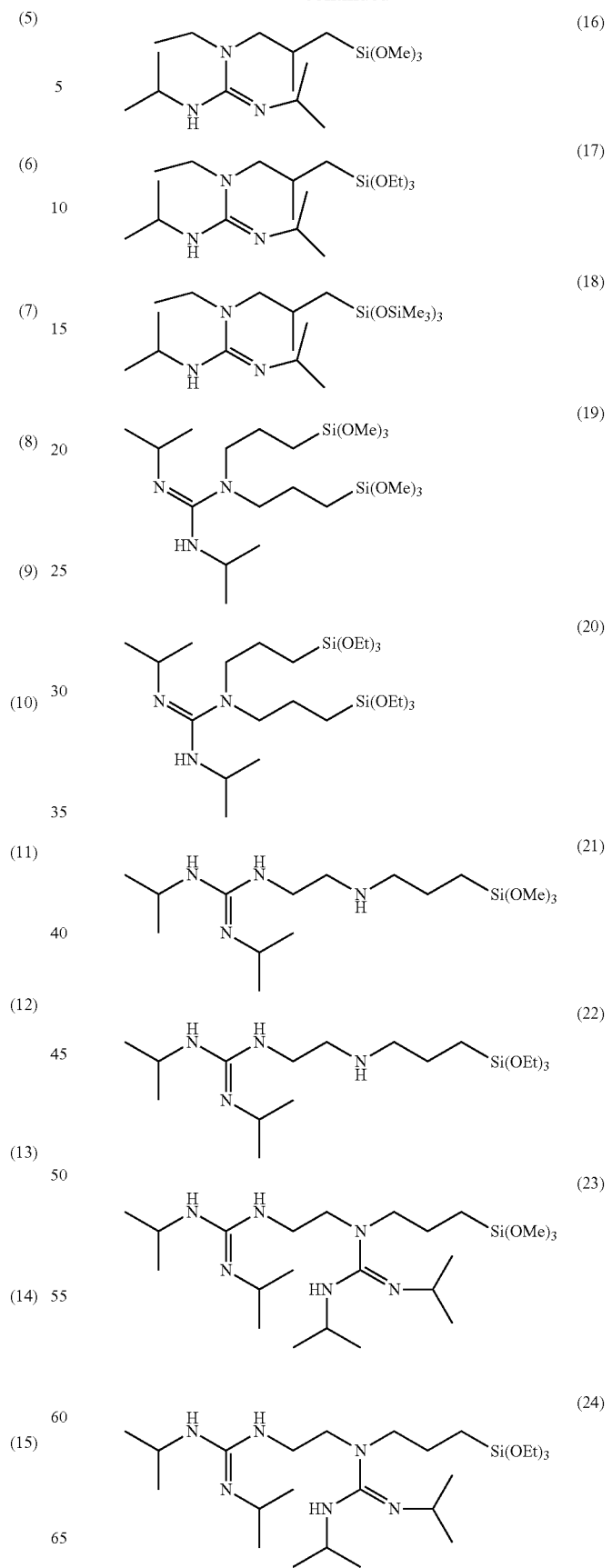

(25) 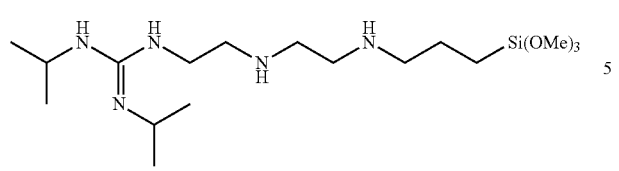
(26) 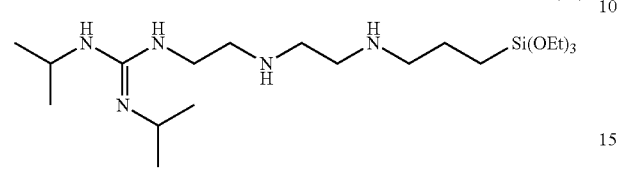
(27) 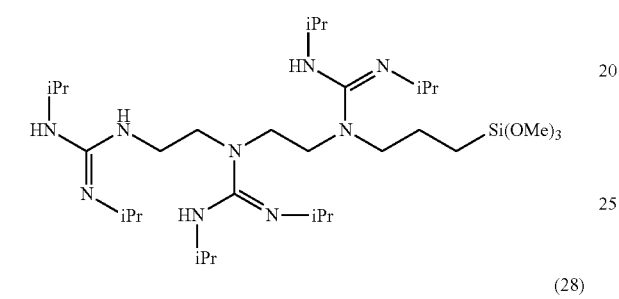
(28) 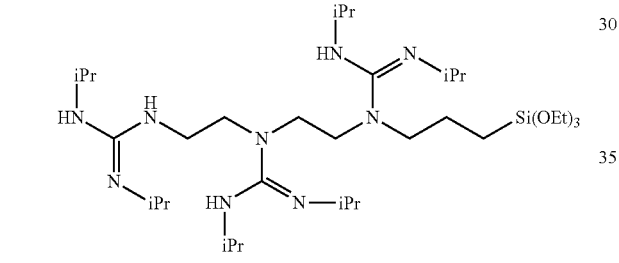
(29) 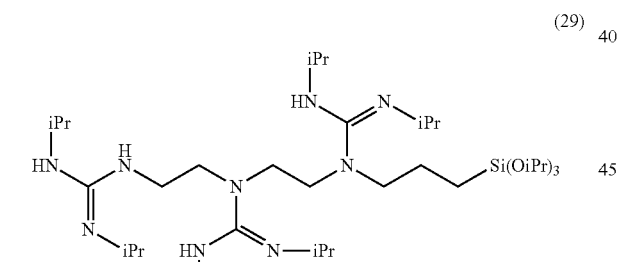
(30) 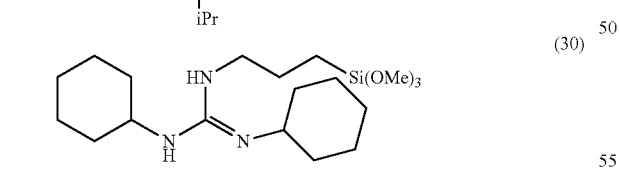
(31) 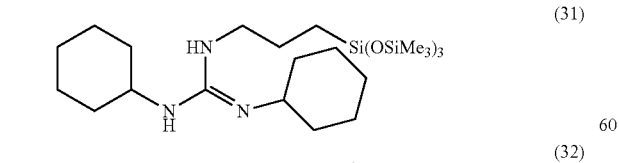
(32) 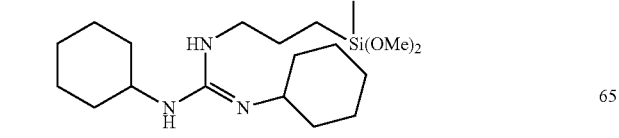
(55) 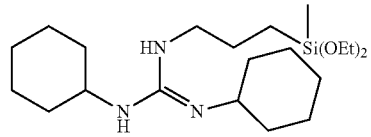
(33) 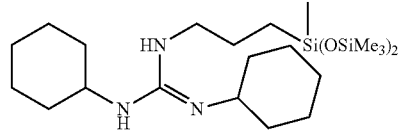
(34) 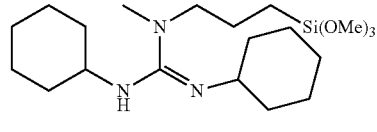
(35) 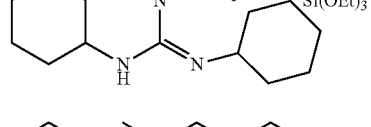
(36) 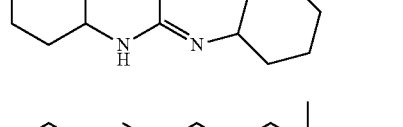
(37) 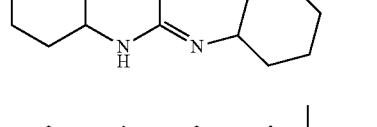
(38) 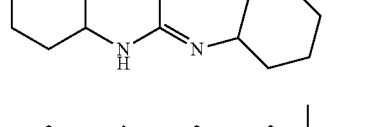
(39) 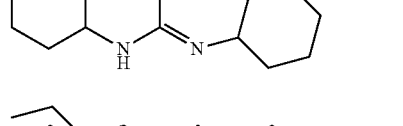
(40) 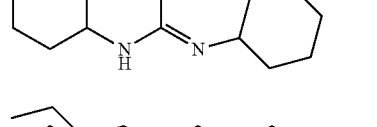
(41) 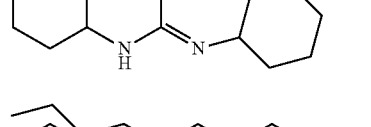
(42) 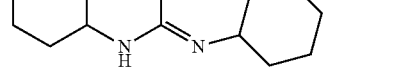

(43) 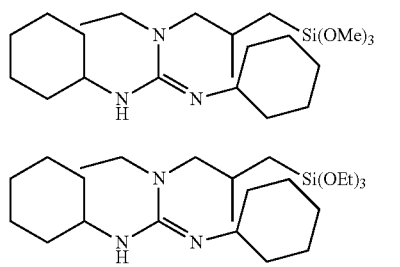
(44)
(45) 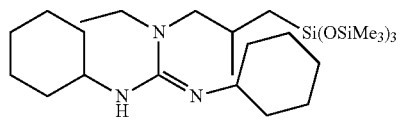
(46) 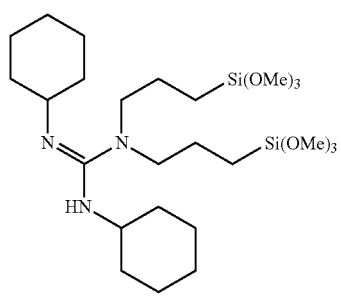
(47) 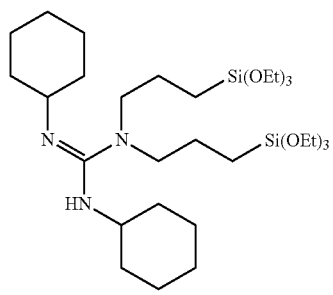
(48) 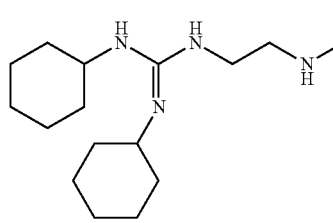
(49) 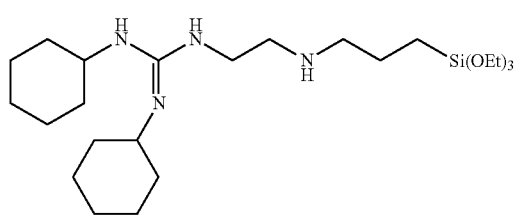
(50) 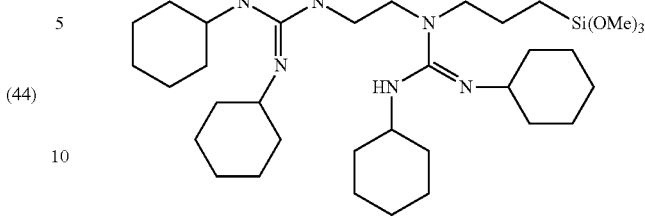
(51) 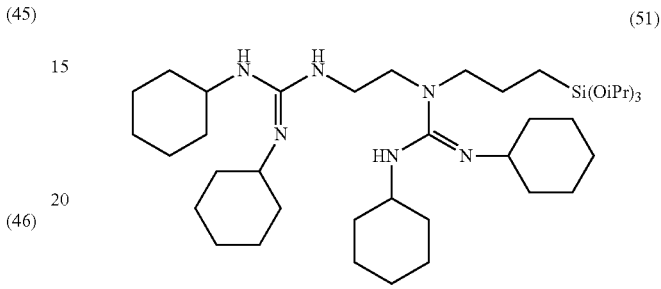
(52) 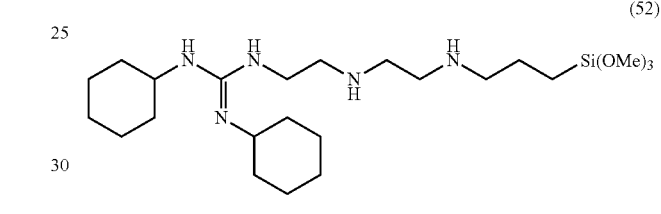
(53) 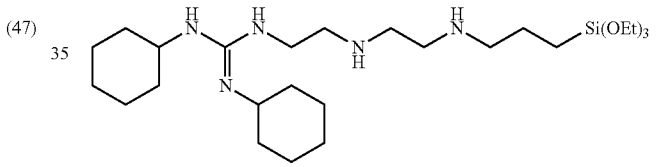
(54) 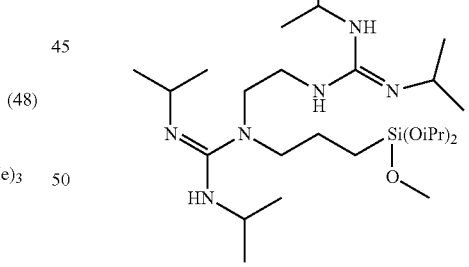
The compounds of formula (I) that are of use according to the invention are obtained, for example, according to a method of preparation which comprises reacting a carbodiimide of formula (II)
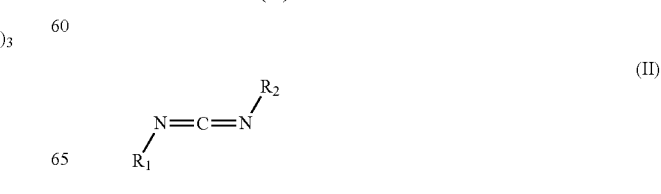

with a primary or secondary amine of formula (III)

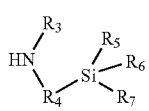
(III)

in which $R_1$, $R_2$, $R_3$, $R_4$, $R_5$, $R_6$ and $R_7$ are as defined above.

The carbodiimides are generally obtained from ureas or thioureas, which are themselves obtained, for example, by reacting a primary amine $R1NH_2$ and an isocyanate $R2NCO$. The carbodiimides are commercially available products which are known per se.

The primary or secondary amine of formula (III), used in the present invention, comprises at least one silylated group. Such amines are known per se and generally used in the silicone field as adhesion promoters. The amines for which $R_5=R_6=R_7=OR_8$, or $R_5=Me$ and $R_6=R_7=OR_8$, or $R_5=R_6=Me$ and $R_7=OR_8$, where Me is the methyl group and $R_8$ is a methyl or ethyl group, are commercially available.

The method thus used consists of a simple and inexpensive synthesis starting from usual products.

According to one variant, the carbodiimide and the silylated amine are heated in the presence or absence of a solvent.

According to another possible variant, the reacting of the carbodiimide of formula (II) with the amine of formula (III) is carried out without solvent. The reaction can be carried out at ambient temperature, but it is preferable to heat at a sufficient temperature which is dependent on the substitution of the amine (III). Thus, if R3=H, it is desirable not to exceed the temperature of 100° C. and if R3≠OH, the higher the temperature, the shorter the reaction time. Thus, the temperature will be between 20 and 150° C., preferably between 70 and 130° C.

It is possible to use an excess of one or other of the constituents: in the case of a volatile carbodiimide in excess, this excess will be eliminated at the end of the reaction, at the same time as the solvent if there is one, and if the amine is in excess, it will participate not only in the catalysis but also as an adhesion promoter. The excess may be from a few percent up to several equivalents, preferably between 10% and 1 equivalent. When the compound in shortage is completely consumed, the solvent, where appropriate, and optionally the excess of the other compound are evaporated off, and the product formed, most commonly a liquid which is not very viscous, is used as it is as catalyst in the polycondensation reactions.

The amount of polycondensation catalysts A according to the invention is between 0.1% and 10% by weight of the total mass, preferably between 0.1% and 5%, whether it is a single-component or two-component preparation.

According to one particularly preferred embodiment, the polyorganosiloxane composition which is curable so as to form the antifouling coat also comprises a catalytically effective amount of at least one polycondensation catalyst A according to the invention and as defined above and a silicone base B comprising:

at least one polyorganosiloxane oil C capable of crosslinking by means of polycondensation so as to give an elastomer;
at least one compound L which exudes at the surface of the antifouling coat when the elastomer network is formed, thus improving the "antifouling" effect;
at least one crosslinking agent D;
optionally, at least one adhesion promoter E;
optionally, at least one siliceous, organic and/or nonsiliceous mineral filler F, and
optionally, at least one pigment, one coloring base or one coloring agent H, and
optionally, at least one solvent K.

Examples of compounds L which exude at the surface of the antifouling coat when the elastomer network is formed, thus improving the "antifouling" effect, are for example:

a) polyorganosiloxane oils corresponding to general formula (II) below:

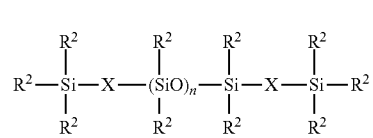
(II)

in which:
$R^2$ is an alkyl, aryl or alkenyl radical, methyl and phenyl radicals being preferred (a particularly preferred example being a methylphenylpolysiloxane oil as described, for example, in patent U.S. Pat. No. 4,025,693),
X is an oxygen atom or a divalent hydrocarbon-based group containing from 1 to 8 carbon atoms,
n is a number defined so as to obtain a diorganopolysiloxane having a viscosity between 10 and $1\times10^6$ mm$^2$/s at 25° C.

These polyorganosiloxane oils can optionally be grafted and comprise acrylic, amide, amine, carbonyl, carboxylic, carboxylate, thiol, thioether, urea, quaternary ammonium, fluoroalkyl or perfluoroalkyl groups.

Grafted or block polydimethylsiloxane oils comprising at least one polyether block (with, for example, polyethylene glycol and/or polypropylene glycol groups) can also be used, b) a hydrocarbon-based liquid compound: for example a polyolefin such as an ethylene/propylene copolymer, and in particular a low-molecular-weight polyisobutene (up to 5000 g/mol and preferably between 300 and 500 g/mol), c) an organic liquid compound chosen from polydienes, polyesters, polyisocyanates, polyurethanes, polyepoxides, fluoroalkyls, fluoroethers, lubricating oils (see, for example, patent FR-A-2 375 305), and plasticizers (for example fatty acid esters which can optionally be substituted with heteroatoms or phosphoric acid esters or halohydrocarbon-based compounds). Polyethylene glycols, polypropylene glycols or castor oil can also be used, and they also provide anti-run properties during the application of the composition, d) liquid paraffins and wax masses of the petrolatum type (JP-A-83/013 673), e) a thermoplastic polymer such as PVC, f) a vinyl chloride/vinyl acetate copolymer (Kokai JP-A-79/026 826), or g) cationic, anionic, nonionic or amphoteric surfactants (JP-A-85/258 271).

Examples of solvents K are, for example: aliphatic, cycloaliphatic or aromatic hydrocarbon-based derivatives, such as white spirit, cyclohexane, toluene, octamethyltrisiloxane or xylene, and ester solvents such as methoxypropyl acetate, n-butyl acetate and 2-ethoxyethyl acetate, and also mixtures thereof. The amount of solvent is determined according to the use or the support to be treated, in such a way as to obtain a paint with acceptable viscosity.

Description of the Silicone Base B:

The silicone bases used in the present invention, which crosslink and cure by means of polycondensation reactions, are well known. These bases are described in detail, in particular, in many patents, and they are commercially available.

These silicone bases may be single-component, i.e. packaged in a single packaging, and stable during storage in the absence of moisture, and curable in the presence of moisture, in particular moisture provided by the ambient air or by the water generated within the base during its use.

In addition to single-component bases, it is possible to use two-component bases, i.e. bases packaged in two packagings, which cure as soon as the polycondensation catalyst according to the invention is incorporated. They are packaged after incorporation of the catalyst in two separate fractions, it being possible for one of the fractions to contain, for example, only the catalyst according to the invention or a mixture with the crosslinking agent.

The polyorganosiloxane oil C is preferably an α,ω-dihydroxypolydiorganosiloxane polymer having a viscosity of between 50 and 5 000 000 mPa·s at 25° C., and the crosslinking agent D is preferably an organosilicon compound bearing more than two hydrolyzable groups bonded to the silicon atoms per molecule. The polyorganosiloxane oil C can also be functionalized at its ends with hydrolyzable radicals obtained by condensation of a precursor bearing hydroxyl functions with a crosslinking silane bearing hydrolyzable radicals. This polyorganosiloxane oil C capable of crosslinking by polycondensation so as to give an elastomer can optionally be grafted with at least one polyether block (with, for example, polyethylene glycol and/or polypropylene glycol groups), polyacrylate block or polymethacrylate block.

As crosslinking agent D, mention may be made of:
silanes having the following general formula (and the products of partial hydrolysis of this silane):

$$R^1_k Si(OR^2)_{(4-k)}$$

in which:
the symbols $R^1$, which may be identical or different, represent $C_1$-$C_{10}$ hydrocarbon-based radicals encompassing:
  $C_1$-$C_{10}$ alkyl radicals such as methyl, ethyl, propyl, butyl, pentyl, 2-ethylhexyl, octyl and decyl radicals, vinyl, allyl and hexenyl radicals, and
  $C_5$-$C_8$ cycloalkyl radicals such as phenyl, tolyl and xylyl radicals,
the symbols $R^2$, which may be identical or different, represent alkyl radicals having from 1 to 8 carbon atoms, such as methyl, ethyl, propyl, butyl, pentyl or 2-ethylhexyl radicals, or $C_3$-$C_6$ oxyalkylene radicals, and k is equal to 0, 1 or 2.

As examples of $C_3$-$C_6$ alkoxyalkylene radicals, mention may be made of the following radicals:

$CH_3OCH_2CH_2$—

$CH_3OCH_2CH(CH_3)$—

$CH_3OCH(CH_3)CH_2$—

$C_2H_5OCH_2CH_2CH_2$—

The crosslinking agents D are products that are accessible on the silicones market; in addition, their use in room temperature curing compositions is known; it appears in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Among the crosslinking agents D, preference is more particularly given to alkyltrialkoxysilanes, alkyl silicates and alkyl polysilicates, in which the organic radicals are alkylated radicals having from 1 to 4 carbon atoms.

As other examples of crosslinking agents D which can be used, mention may more particularly be made of the following silanes:

propyltrimethoxysilane, methyltrimethoxysilane, ethyltrimethoxysilane, vinyltriethoxysilane, methyltriethoxysilane, propyltriethoxysilane, tetraethoxysilane, tetrapropoxysilane, silanes of 1,2-bis(trialkoxysilyl)ethane type, such as:

1,2-bis(trimethoxysilyl)ethane or 1,2-bis(tri-ethoxysilyl) ethane, tetraisopropoxysilane, or else: $CH_3Si(OCH_3)_3$; $C_2H_5Si(OC_2H_5)_3$; $C_2H_5Si(OCH_3)_3 CH_2$=$CHSi(OCH_3)_3$; $CH_2$=$CHSi(OCH_2CH_2OCH_3)_3$, $C_6H_5Si$—$(OCH_3)_3$; $[CH_3][OCH(CH_3)CH_2OCH_3]Si[OCH_3]_2$, $Si(OCH_3)_4$; $Si(OC_2H_5)_4$; $Si(OCH_2CH_2CH_3)_4$; $Si(OCH_2CH_2CH_2CH_3)_4$, $Si(OC_2H_4OCH_3)_4$; $CH_3Si(OC_2H_4OCH_3)_3$; $ClCH_2Si(OC_2H_5)_3$.

As other examples of crosslinking agent D, mention may be made of ethyl polysilicate or n-propyl polysilicate.

Other crosslinking agents D which can also be used are silanes having the following general formula (and the products of partial hydrolysis of this silane):

$$R^1_k Si(Y)_{(4-k)}$$

in which:
the symbols $R^1$, which may be identical or different, are as defined above,
the symbols Y, which may be identical or different, represent hydrolyzable groups such as, for example, amino, amido, aminoxy, oxime, acyloxy and alkenyloxy groups.

From 0.1 to 60 parts by weight of crosslinking agent D per 100 parts by weight of polyorganosiloxane C capable of crosslinking by polycondensation to give an elastomer, are generally used.

Thus, the composition according to the invention may comprise at least one adhesion promoter E such as, for example, organosilicon compounds bearing both:

(1) one or more hydrolyzable groups bonded to the silicon atom, and (2) one or more organic groups substituted with radicals comprising a nitrogen atom or chosen from the group of (meth)acrylate, epoxy and alkenyl radicals, and even more preferably from the group consisting of the following compounds taken alone or as a mixture:

vinyltrimethoxysilane (VTMO),
3-glycidoxypropyltrimethoxysilane (GLYMO),
methacryloxypropyltrimethoxysilane (MEMO),

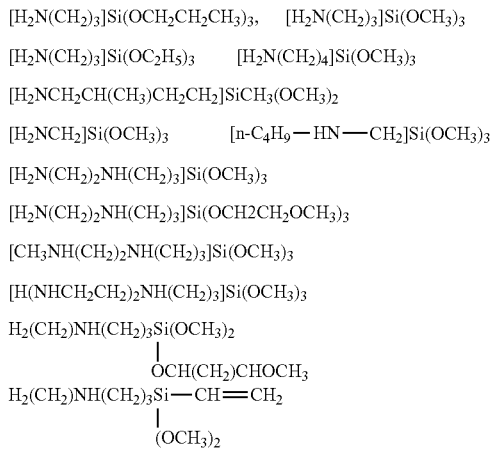

silanes of 3-ureidopropyltrialkoxysilane type, such as: 3-ureidopropyltriethoxysilane or 3-ureido-propyltrimethoxysilane,
or polyorganosiloxane oligomers containing such organic groups at a content greater than 20%.

For the single- and two-component bases, very finely divided products, the average particle diameter of which is less than 0.1 μm, are used as mineral fillers F. Among these fillers are fumed silicas and precipitated silicas; their BET specific surface area is generally greater than 40 m²/g. These fillers can also be in the form of more coarsely divided products, of average particle diameter greater than 0.1 μm. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m²/g.

These fillers may have been surface-modified by treatment with the various organosilicon compounds customarily used for this purpose. Thus, these organo-silicon compounds may be organochlorosilanes, diorgano-cyclopolysiloxanes, hexaorganodisiloxanes, hexaorgano-disilazanes or diorganocyclopolysilazanes (French patents FR-A-1 126 884, FR-A-1 136 885 and FR-A-1 236 505, and British patent GB-A-1 024 234). The treated fillers contain, in most cases, from 3% to 30% of their weight of organosilicon compounds. The fillers may consist of a mixture of several types of fillers of different particle size; thus, for example they may consist of from 30% to 70% of finely divided silicas with a BET specific surface area of greater than 40 m²/g and of from 70% to 30% of more coarsely divided silicas with a specific surface area of less than 30 m²/g.

The purpose of introducing fillers is to give good mechanical and rheological properties to the elastomers that result from the curing of the compositions in accordance with the invention.

In combination with these fillers, use may be made of mineral and/or organic pigments. Examples of pigments H are, by way of indication: red iron oxide, zinc oxide, carbon black, graphite, yellow iron oxide, titanium oxide white, chromium oxide, cobalt oxide, litharge, ultramarine and molybdenum red and yellow, or known organic pigments widely used in the aquatic paints field.

Other customary auxiliary agents and additives (thixotroping agents, anti-run agents, etc.) can be incorporated into the composition according to the invention.

In addition to the main constituents, nonreactive linear polyorganosiloxane polymers G can be introduced, preferably with the aim of acting on the physical characteristics of the compositions in accordance with the invention and/or on the mechanical properties of the elastomers resulting from the curing of these compositions.

These nonreactive linear polyorganosiloxane polymers G are well known; they comprise more especially: α,ω-bis-(triorganosiloxy)diorganopolysiloxane polymers having viscosities of at least 10 mPa·s at 25° C., formed essentially from diorganosiloxy units and from at most 1% of monoorganosiloxy and/or siloxy units, the organic radicals bonded to the silicon atoms being chosen from methyl, vinyl and phenyl radicals, at least 60% of these organic radicals being methyl radicals and at most 10% being vinyl radicals. The viscosity of these polymers can reach several tens of millions of mPa·s at 25° C.; they therefore comprise oils with a fluid-to-viscous appearance and soft-to-hard gums. They are prepared according to the usual techniques described more specifically in French patents FR-A-978 058, FR-A-1 025 150, FR-A-1 108 764 and FR-A-1 370 884. The α,ω-bis(trimethylsiloxy)dimethylpolysiloxane oils having a viscosity ranging from 10 mPa·s to 1000 mPa·s at 25° C. are preferably used. These polymers which act as plasticizers can be introduced in a proportion of at most 70 parts, preferably from 5 to 20 parts, per 100 parts of polyorganosiloxane oil C capable of crosslinking by polycondensation.

The compositions according to the invention can also comprise at least one silicone resin H1. These silicone resins are branched organopolysiloxane polymers which are well known and commercially available. They have, per molecule, at least two different units chosen from those of formulae $R'''_3SiO_{1/2}$ (M unit), $R'''_2SiO_{2/2}$ (D unit), $R'''SiO_{3/2}$ (T unit) and $SiO_{4/2}$ (Q unit). The R''' radicals are identical or different and are chosen from linear or branched alkyl radicals, and vinyl, phenyl and 3,3,3-trifluoropropyl radicals. Preferably, the alkyl radicals have from 1 to 6 carbon atoms inclusive. More particularly, as alkyl radicals R, mention may be made of methyl, ethyl, isopropyl, tert-butyl and n-hexyl radicals. These resins are preferably hydroxylated and, in this case, have a hydroxyl group weight content of between 5 and 500 meq/100 g.

As examples of resins, mentioned may be made of MQ resins, MDQ resins, DT resins and MDT resins.

In order to produce the compositions in accordance with the invention, it is necessary, in the case of the single-component compositions, to use equipment which makes it possible to intimately mix, away from moisture with or without the input of heat, the various fundamental constituents to which the abovementioned adjuvants and additives are optionally added. All these ingredients can be charged to the equipment in any order of introduction.

The invention also relates to a method for applying an antifouling coating to a support intended to be employed in aquatic uses, characterized in that it comprises the following steps:

a) optionally, the application of at least one primer coat to said support comprising at least one anticorrosive product, b) optionally, the application of at least one intermediate primer coat promoting adhesion between the coats and curing of said primer coat, c) the application of an adhesion-promoting coat or tie coat to said primer coat or to said support when the primer coat is absent, d) the curing of said tie coat, e) the application of an antifouling coat or topcoat, and f) the curing of said antifouling coat, said method being characterized in that the antifouling coat and/or the tie coat is/are prepared from a curable polyorganosiloxane composition R according to the invention and as described above.

The thickness of the coats applied can vary and film-coatings 12 to 1000 microns thick (with the proviso that the deposit is homogeneous) have given good results. The standard thickness of the various coats is approximately 50 μm for the primer, 150 μm for the tie coat and 150 μm for the topcoat. Of course, those skilled in the art will be able to adjust the thickness of the various coats according to the desired result.

The final subject of the invention relates to the use of a curable polyorganosiloxane composition R according to the invention and as described above, for forming a tie coat adhesion-promoting coating or a topcoat antifouling coating of a paint intended for protecting an article against the adhesion of aquatic organisms.

Single-component bases are described in detail, for example, in patents EP 141 685, EP 147 323, EP 102 268, EP 21 859, FR 2 121 289 and FR 2 121 631, cited by way of reference.

Two-component bases are described in detail, for example, in patents EP 118 325, EP 117 772, EP 10 478, EP 50 358, EP 184 966, U.S. Pat. No. 3,801,572 and U.S. Pat. No. 3,888,815, cited by way of reference.

Further advantages and characteristics of the present invention will become apparent on reading the following examples which are given by way of unlimiting illustration.

EXAMPLES

I) Preparation of the Catalysts According to the Invention 1. 1,2-Diisopropyl-3-(3-(trimethoxysilyl)propyl)-guanidine (1)

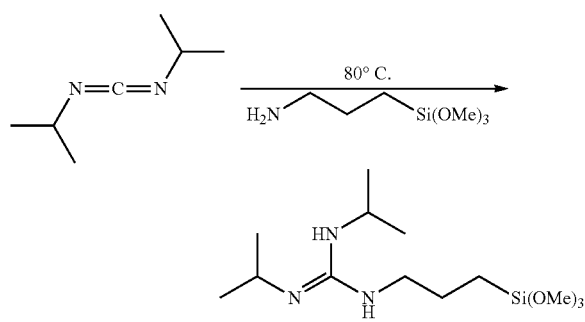

A mixture of 11.74 g of (3-(trimethoxysilyl)propyl)amine (0.0654 mol) and of 9.9 g of diisopropylcarbodiimide (0.0785 mol, 20% excess) is heated at 80° C. for 6 h30. GC analysis then shows a conversion of greater than 97% of the amine. The colorless final mixture is evaporated to dryness at 100° C. under 2 mbar for 2 h, so as to give 22.5 g of a colorless liquid of low viscosity, corresponding to the expected guanidine.

$^1$H NMR/CDCl$_3$ (ppm): 0.69 (2H, m), 1.12 (12H, d), 1.63 (2H, quint.), 2.99 (2H, t), 3.48 (11H, bs—the shift of the isopropyl protons is merged with the methoxy protons).

2. 1-(3-(Diethoxy(methyl)silyl)propyl)-2,3-diisopropyl-guanidine (5)

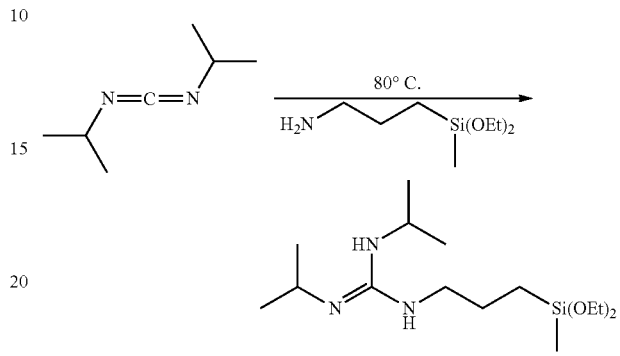

A mixture of 28.94 g of 3-(diethoxy(methyl)silyl)-propylamine (0.151 mol, 20% excess) and of 15.9 g of diisopropylcarbodiimide (0.126 mol) is heated at 80° C. for 9 h (97.3% conversion of the carbodiimide).

The colorless final mixture is devolatilized at 100° C. under 2 mbar for 2 h so as to give 44 g of a colorless liquid of low viscosity, corresponding to a mixture of the expected guanidine and of the silylated amine in excess (9.8 wt %).

$^1$H NMR/CDCl$_3$ (ppm) of the silylated guanidine: 0.0 (3H, s), 0.54 (2H, m), 1.01 (12H, d), 1.1 (6H, t), 1.49 (2H, m), 2.88 (2H, t), 3.46 (2H, m), 3.64 (4H, quad.).

3. 2,3-Diisopropyl-1-methyl-1-(3-(trimethoxysilyl)-propyl)guanidine (7)

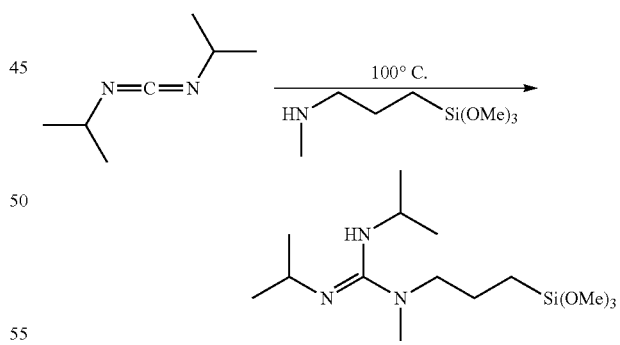

A mixture of 60.5 g of N-methyl-(3-(trimethoxysilyl)-propyl)amine (0.313 mol) and of 47.6 g of diisopropylcarbodiimide (0.376 mol, 20% excess) is heated at 100° C. for 3 h30 (greater than 99% conversion of the amine). The colorless final mixture is devolatilized at 100° C. under 2 mbar for 2 h so as to give 99.5 g of a colorless liquid of low viscosity, corresponding to the expected guanidine.

$^1$H NMR/CDCl$_3$ (ppm): 0.5 (2H, m), 1.0 (12H, 2 d), 1.53 (2H, quint.), 2.61 (3H, s), 2.98 (2H, t), 3.21 (1H, sept), 3.32 (1H, sept), 3.48 (9H, s).

4. 2,3-Diisopropyl-1-methyl-1-(3-(methyldimethoxy-silyl)propyl)guanidine (10)

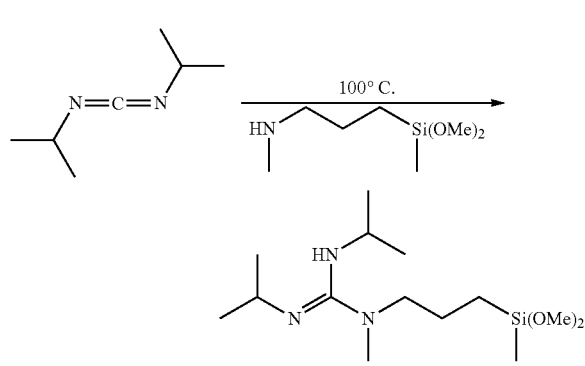

A mixture of 27 g of N-methyl-(3-(methyl-dimethoxysilyl)propyl)amine (0.152 mol, 20% excess) and of 16 g of diisopropylcarbodiimide (0.127 mol) is heated at 100° C. for 8 h (98% conversion of the carbodiimide). The colorless final mixture is devolatilized at 100° C. under 2 mbar for 2 h so as to give 39.3 g of a colorless liquid of low viscosity, corresponding to the expected guanidine, containing 2 wt % of the starting amine.

$^1$H NMR/CDCl$_3$ (ppm) of the guanidine: 0.0 (3H, s), 0.46 (2H, m), 0.97 (12H, m), 1.46 (2H, m), 2.58 (3H, s), 2.95 (2H, t), 3.18 (1H, m), 3.28 (1H, m), 3.40 (6H, s).

5. 1-Butyl-2,3-diisopropyl-1-(3-(trimethoxysilyl)propyl)guanidine (13)

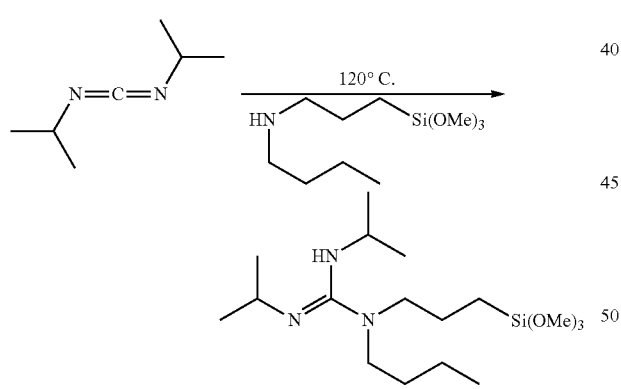

A mixture of 45 g of N-butyl-(3-(trimethoxysilyl)-propyl)amine (0.191 mol) and of 28.95 g of diisopropylcarbodiimide (0.229 mol, 20% excess) is heated at 120° C. for 20 h (93% conversion of the amine). The colorless final mixture is devolatilized at 120° C. under 1 mbar for 2 h so as to give 67 g of a colorless liquid of low viscosity, corresponding to the expected guanidine, containing 4 wt % of the starting amine.

$^1$H NMR/CDCl$_3$ (ppm) of the guanidine: 0.58 (2H, m), 0.88 (3H, t), 1.07 (12H, 2 d), 1.26 (2H, sext.), 1.44 (2H, quint.), 1.58 (2H, quint.), 3.06 (4H, m), 3.30 (1H, m), 3.41 (1H, m), 3.55 (9H, s).

6. 1,1-bis(3-(trimethoxysilyl)propyl)-2,3-diisopropyl-guanidine (19)

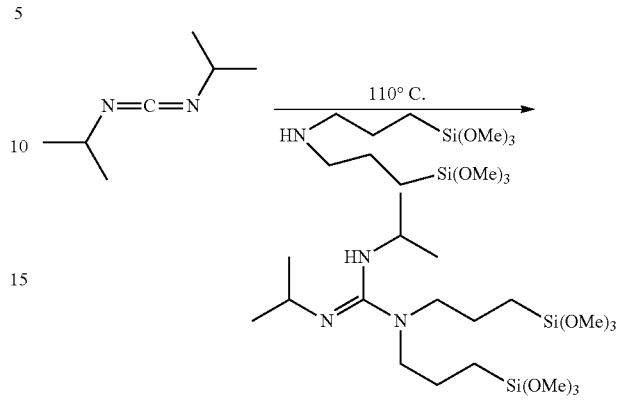

A mixture of 30.84 g of bis(3-(trimethoxysilyl)propyl)-amine (0.0903 mol) and of 13.68 g of diisopropyl-carbodiimide (0.1084 mol, 20% excess) is heated at 110° C. for 31 h (94% conversion of the amine). The colorless final mixture is devolatilized at 100° C. under 2 mbar for 2 h so as to give 42 g of a colorless liquid of low viscosity, corresponding to the expected guanidine, containing 4% of the starting amine.

$^1$H NMR/CDCl$_3$ (ppm) of the guanidine: 0.56 (4H, m), 1.07 (12H, m), 1.57 (4H, m), 3.05 (4H, t), 3.30 (1H, sept.), 3.43 (1H, sept.), 3.54 (18H, s).

7. 2,3-Dicyclohexyl-1-methyl-1-(3-(trimethoxysilyl)-propyl)guanidine (34)

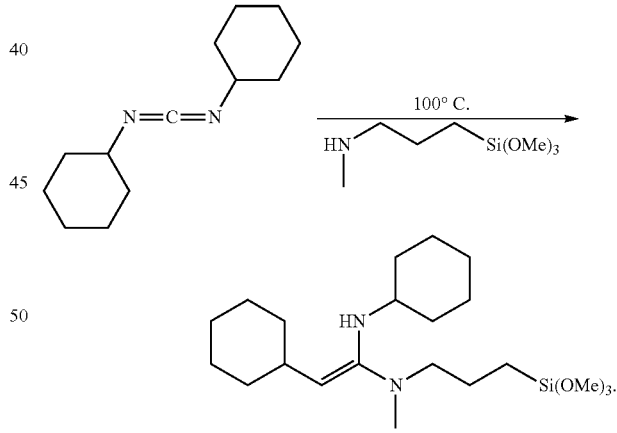

A mixture of 23.23 g of N-methyl-(3-(trimethoxy-silyl) propyl)amine (0.12 mol, 20% excess) and of 20.65 g of dicyclohexylcarbodiimide (0.1 mol) is heated at 100° C. for 6 h (94% carbodiimide conversion). The colorless final mixture is devolatilized at 100° C. under 2 mbar for 2 h so as to give 41.3 g of a colorless liquid of medium viscosity, corresponding to the expected guanidine, containing 6% of starting amine.

$^1$H NMR/CDCl$_3$ (ppm) of the guanidine: 0.58 (2H, m), 1-1.4 (10H, m), 1.5-2 (12H, m), 2.69 (3H, s), 2.8-3.1 (2H, m), 3.07 (2H, t), 3.56 (9H, s).

8. 2,3-Diisopropyl-1-[(3-ethoxysilyl)propyl]-1-[2-[2,3-(diisopropyl)guanidino]ethyl]guanidine (54)

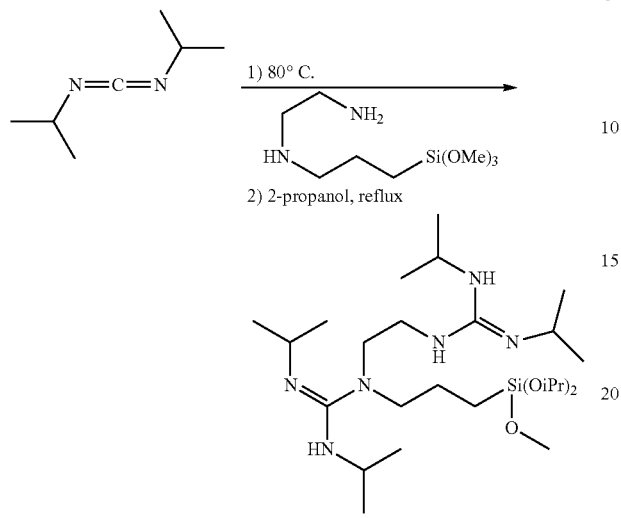

A mixture of 20.01 g of N-[3-(trimethoxysilyl)-propyl]ethylenediamine (0.09 mol) and of 27.26 g of diisopropylcarbodiimide (0.216 mol, 20% excess) is heated at 90° C. for 8 h and at 70° C. for 72 h (100% conversion with respect to diamine, 93% with respect to monoguanidine intermediates).

The colorless final mixture is devolatilized at 100° C. under 2 mbar for 2 h so as to give 41.6 g of a very viscous liquid which crystallizes after a few minutes. The solid is taken up with 50 ml of 2-propanol, and the solution is refluxed, while distilling off the methanol formed, for 3 h, and then again evaporated to dryness so as to give a liquid of medium viscosity, corresponding to the expected guanidine, with SiOMe(OiPr)$_2$ average substitution.

9. 2,3-Diisopropyl-1-methyl-1-(3-(bis(trimethylsilyloxy)methylsilyl)propyl)guanidine (12)

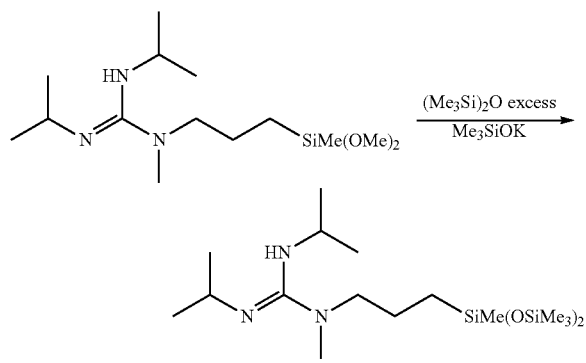

A mixture of 2 g of 2,3-diisopropyl-1-methyl-1-(3-(methyldimethoxysilyl)propyl)guanidine, of 10 g of hexamethyldisiloxane and of 50 mg of potassium silanolate is heated at 100° C. for 24 h. After cooling, the cloudy medium is diluted with heptane. The suspension is filtered and then evaporated to dryness so as to give 2.5 g of a nonviscous colorless liquid. The $^1$H NMR analysis shows that the exchange has been carried out to more than 90%.

II) Preparation of the Topcoats

Formulation: all the amounts are expressed in parts by weight.

80 parts α,ω-dihydroxylated polydimethylsiloxane oil having a viscosity of 3500 centipoises 10 parts ethyl silicate 5 parts methylphenylpolysiloxane oil sold by the company Bluestar Silicones under the name Rhodorsil Huile 510V100®

2 parts methylphenylpolysiloxane oil sold by the company Bluestar Silicones under the name Rhodorsil Huile 550®

3 parts Aerosil 200® silica sold by the company Degussa 1 part castor oil 0.7 part Bayferrox 130F® pigment sold by the company Bayer 0.1 part Disperbyk 140® dispersant sold by the company Byk 20 parts xylene Added to this formulation are the following:

Formulation 1: 2 mmol of the catalyst (7): 2,3-diisopropyl-1-methyl-1-(3-(trimethoxysilyl)-propyl)guanidine.

Formulation 2: 2.2 mmol of the catalyst (34): 2,3-dicyclohexyl-1-methyl-1-(3-(trimethoxysilyl)-propyl)guanidine.

Comparative 1: 2 mmol of tetramethylguanidyl-propyltrimethoxysilane (pentasubstituted silylated guanidine)

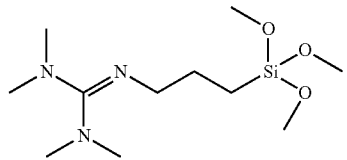

The times necessary for obtaining a dry surface (or Tack Free Time) and also the pot life corresponding to these three formulations are detailed in the following table.

TABLE I

| Catalyst tested | Amount (mmol) | Tack Free Time (min) | Pot-life (min) |
| --- | --- | --- | --- |
| Formulation 1 Catalyst (34) Invention | 2.0 | 36 | More than 60 min |
| Formulation 2 Catalyst (7) Invention | 2.2 | 30 | More than 60 min |
| Comparative 1 tetramethylguanidyl-propyltrimethoxysilane | 2 | 65 | More than 60 min |

"Tack free time" = time necessary to obtain a dry surface.

The catalysts according to the invention (formulations 1 and 2, tetrasubstituted silylated guanidines) make it possible to obtain a tack free surface 30 to 36 minutes after their application. On the other hand, the formulation catalyzed with tetramethylguanidylpropyl-trimethoxysilane (comparative 1, pentasubstituted silylated guanidine) requires 65 minutes (i.e. 100% more time) in order to obtain a tack free surface.

III) Antifouling Evaluation

Two metal sheets made of sandblasted and degreased steel are coated with an epoxy primer coat (prepared from SigmaShield 610® sold by the company Sigmakalon) approximately 50 μm thick. After drying for 72 hours at ambient temperature, a tie coat (prepared from SigmaGlide 790® sold by the company Sigmakalon) approximately 150 microns thick is applied. After drying for 48 hours at ambient temperature, a coat of approximately 150 μm of the topcoat prepared according to formulations 1 and 2 described above in paragraph III) is applied.

After drying for 48 hours at ambient temperature, the sheets are immersed in a marine medium (in seawater) and are examined after 12 and 23 weeks of immersion.

After abundantly washing with water, the antifouling evaluation is 100, which indicates a complete absence of organisms on the coated sheet.

The invention claimed is:

1. An article having antifouling properties and intended to be employed in aquatic uses which comprises:
    a) a support,
    b) optionally, at least one primer coat on said support comprising at least one anticorrosive product,
    c) optionally, at least one intermediate primer coat promoting adhesion between the coats,
    d) at least one tie coat, deposited on said primer coat or on said support when the primer coat is absent, and
    e) at least one antifouling coat, deposited on said tie coat,
    wherein the antifouling coat and/or the tie coat is/are prepared from a curable polyorganosiloxane composition R containing no metal catalyst, and wherein R comprises, firstly, a silicone base B capable of curing by means of a polycondensation reaction so as to give a silicone elastomer and, secondly, a catalytically effective amount of at least one polycondensation catalyst A
        in which the polycondensation catalyst A is a silylated organic compound chosen from the group consisting of the following compounds:

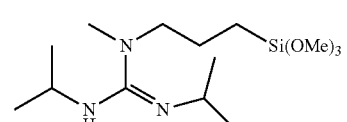

(7)

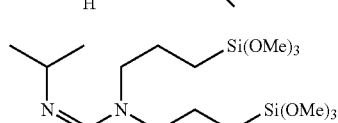

(19)

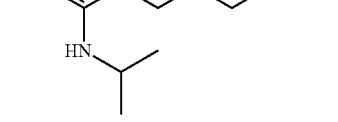

(20)

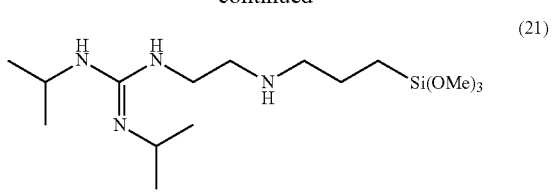

(21)

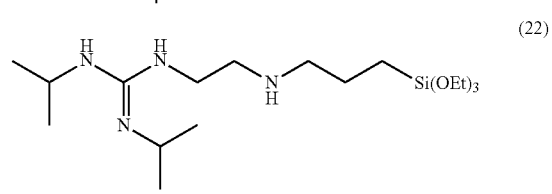

(22)

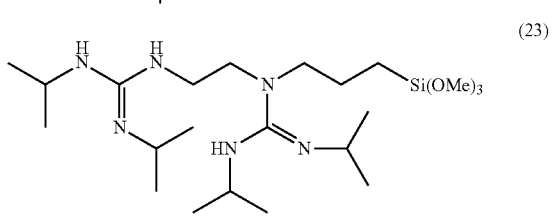

(23)

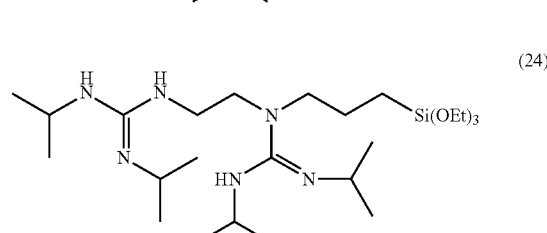

(24)

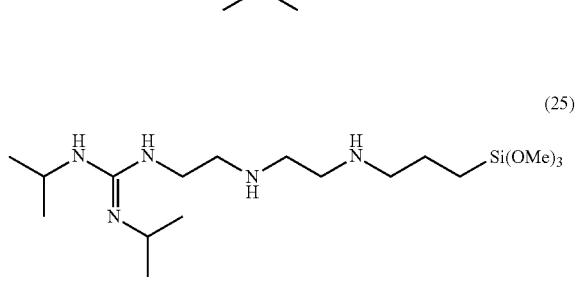

(25)

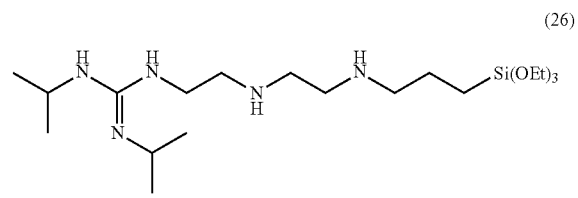

(26)

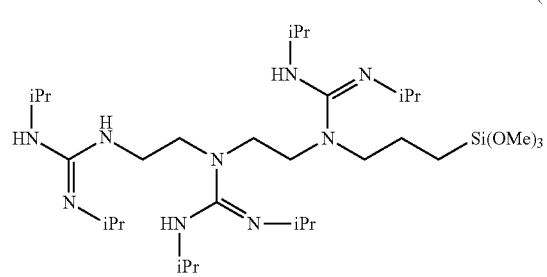

(27)

-continued

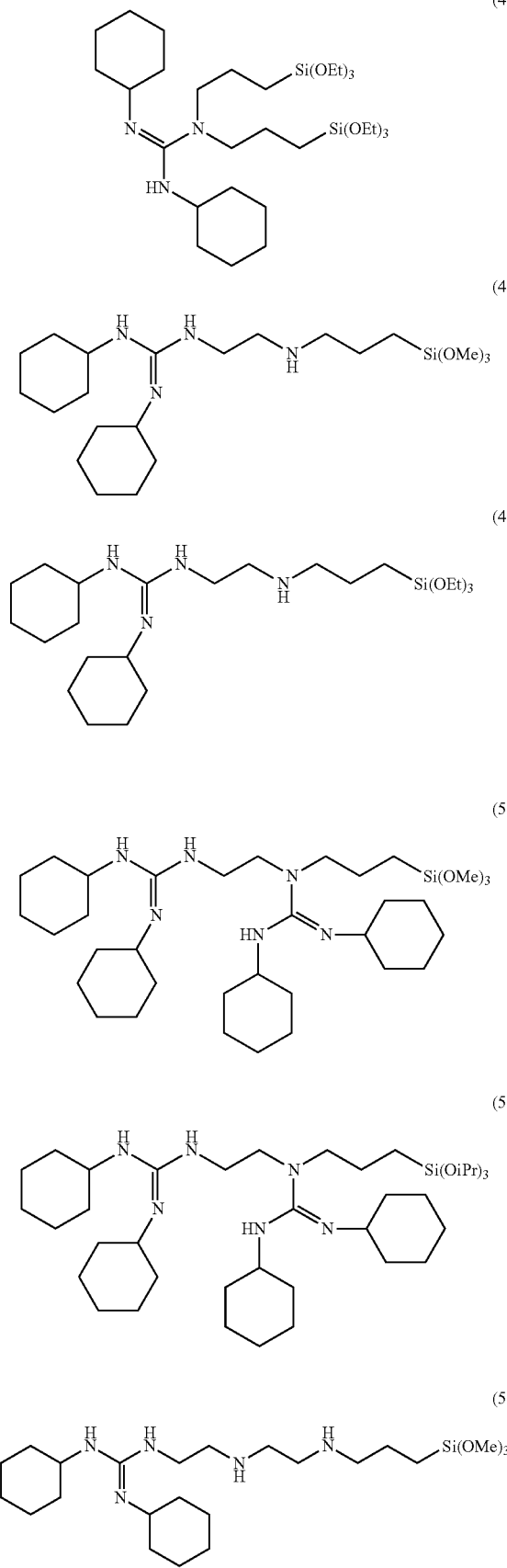

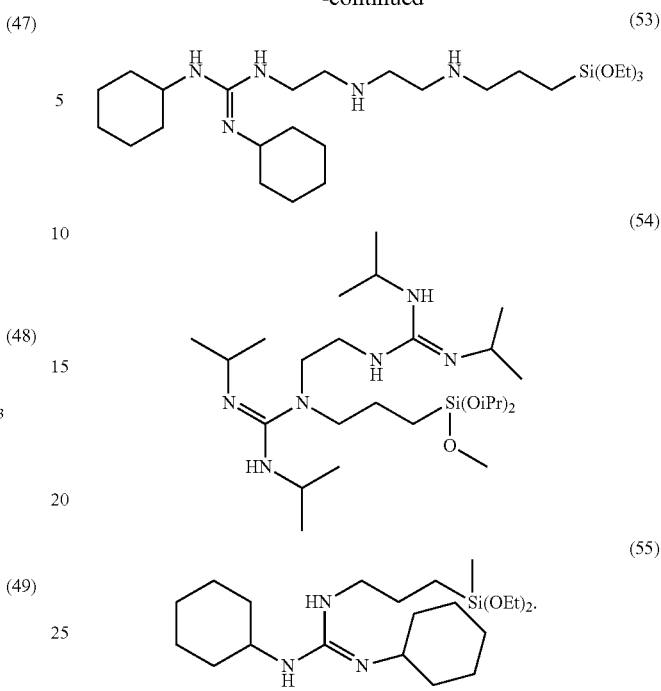

2. An article as claimed in claim 1 wherein the antifouling coat and the tie coat contain no metal catalyst.

3. The article as claimed in claim 1, wherein the silicone base B comprises:
at least one polyorganosiloxane oil C capable of crosslinking by polycondensation so as to give an elastomer;
at least one crosslinking agent D;
at least one compound L which exudes at the surface of the antifouling coat
optionally, at least one adhesion promoter E;
optionally, at least one siliceous, organic and/or nonsiliceous mineral filler F, and
optionally, at least one coloring base and/or coloring agent H, and
optionally, at least one solvent K.

4. The article as claimed in claim 3, wherein at least one adhesion promoter E is present.

5. The article as claimed in claim 3, wherein at least one mineral filler F is present.

6. The article as claimed in claim 1, wherein at least one primer coat b) is present.

7. The article as claimed in claim 1, wherein at least one intermediate primer coat c) is present.

8. The article as claimed in claim 1, where the at least one tie coat layer d) is prepared from the curable polyorganosiloxane composition R.

9. The article as claimed in claim 1, where the at least one antifouling coat e) is prepared from the curable polyorganosiloxane composition R.

10. The article as claimed in claim 1, wherein the polycondensation catalyst comprises catalyst (7).

11. The article as claimed in claim 1, wherein the polycondensation catalyst comprises catalyst (34).

12. The article as claimed in claim 1, wherein the catalyst is selected from catalysts (30) to (54).

13. The article as claimed in claim 1, wherein the catalyst is selected from catalyst (19) or (20).

14. The article as claimed in claim 1, wherein the catalyst is selected from catalysts (21) to (29).

15. A method for applying an antifouling coating to a support which is intended to be employed in aquatic uses, said method comprising:

a) the application of at least one primer coat to said support comprising at least one anticorrosive product, b) optionally, the application of at least one intermediate primer coat promoting adhesion between the coats and curing of said primer coat, c) the application of a tie coat to said primer coat, d) the curing of said tie coat, e) the application of an antifouling coat, and f) the curing of said antifouling coat, wherein the antifouling coat and/or the tie coat is/are prepared from a curable polyorganosiloxane composition R containing no metal catalyst, and wherein R comprises, firstly, a silicone base B capable of curing by means of a polycondensation reaction so as to give a silicone elastomer and, secondly, a catalytically effective amount of at least one polycondensation catalyst A selected from the group consisting of

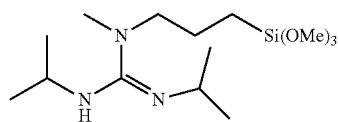

(7)

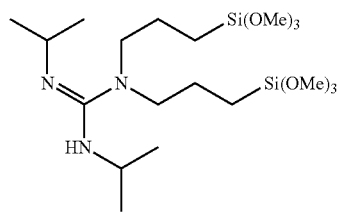

(19)

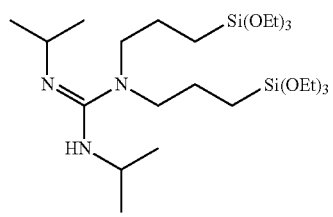

(20)

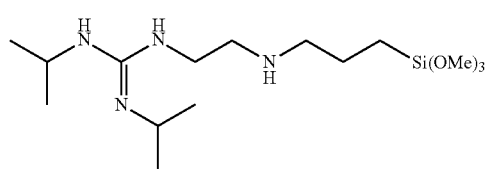

(21)

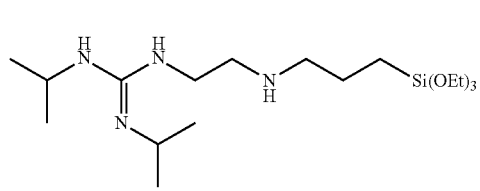

(22)

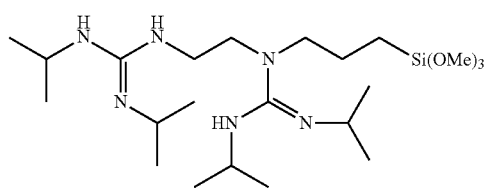

(23)

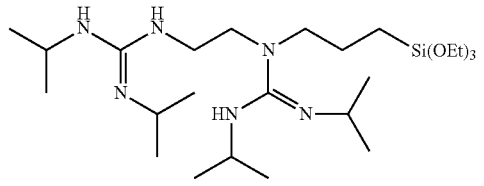

(24)

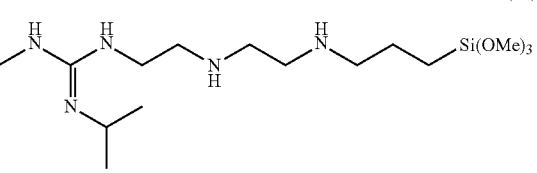

(25)

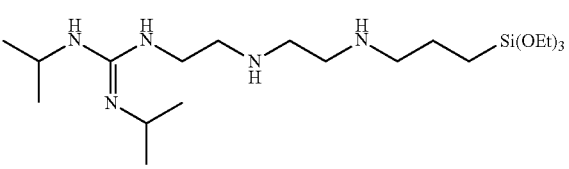

(26)

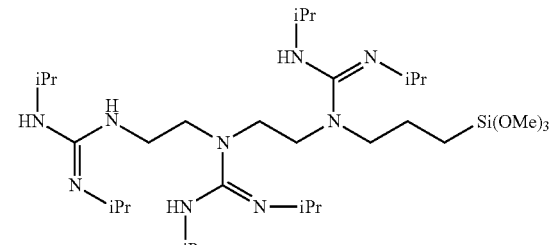

(27)

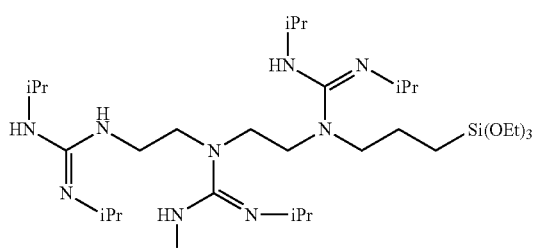

(28)

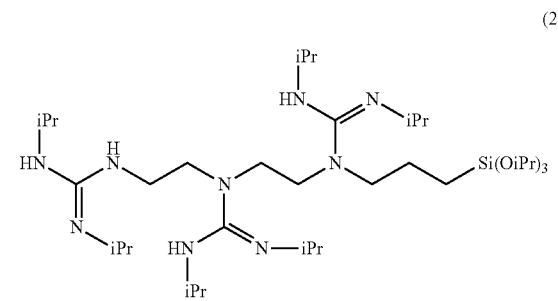

(29)

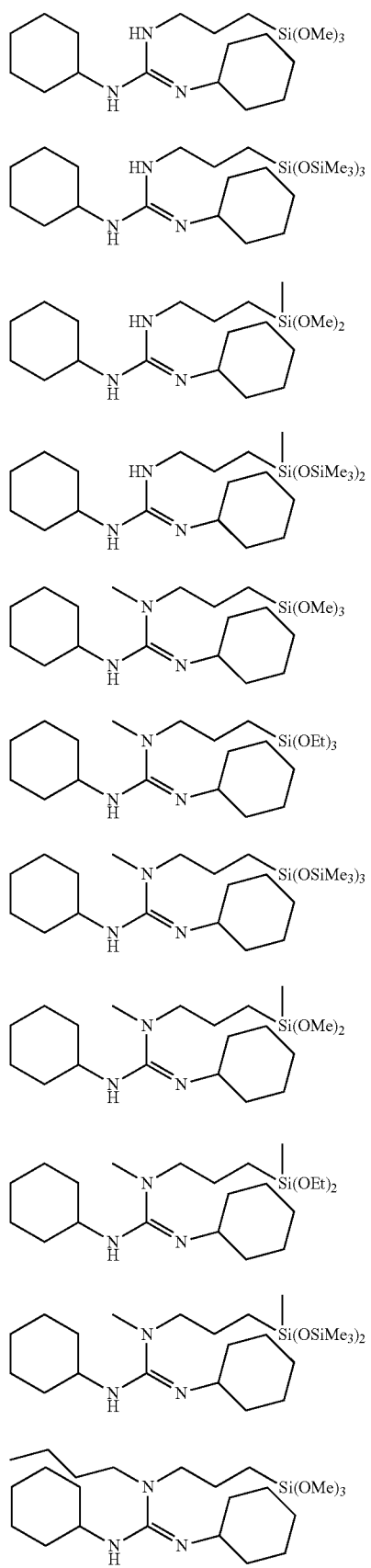
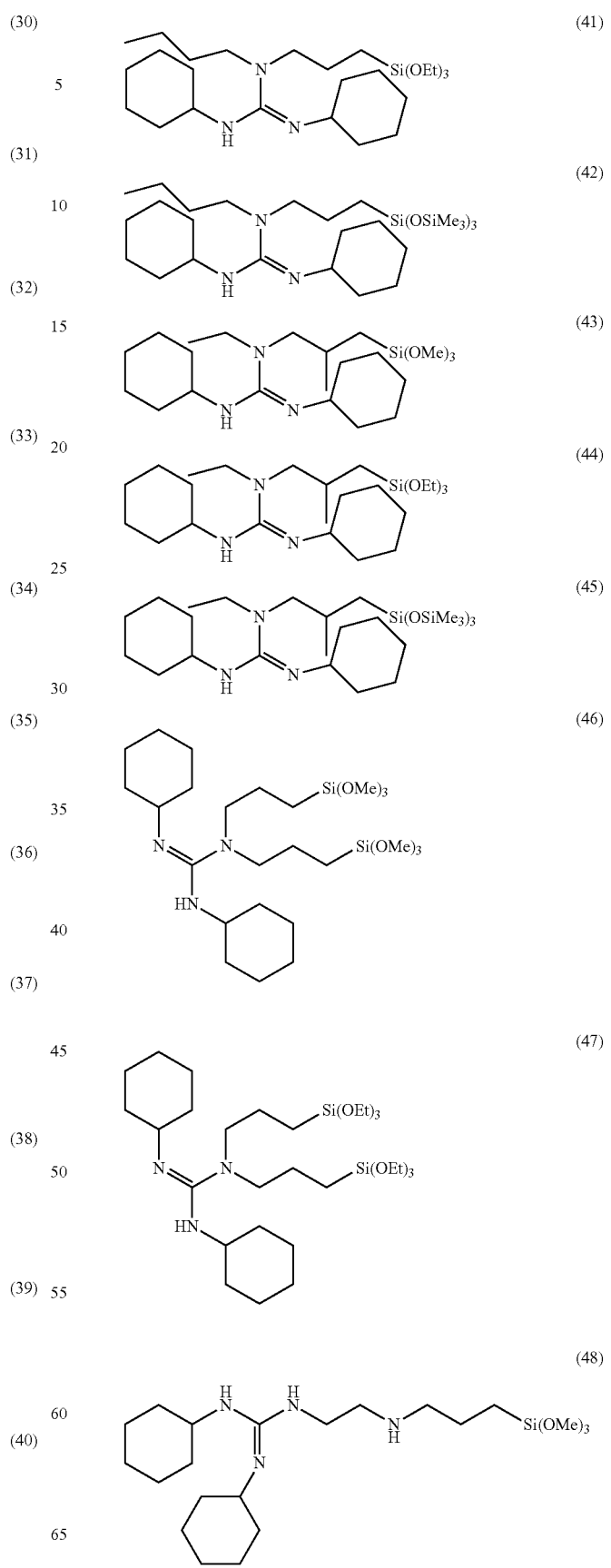

-continued

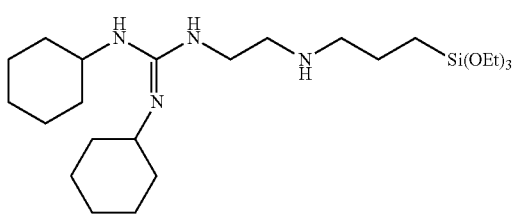
(49)

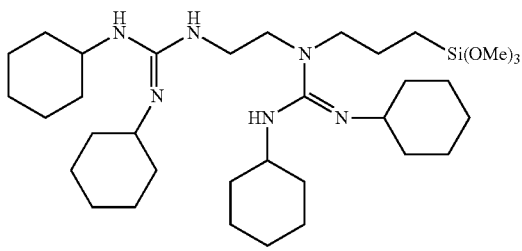
(50)

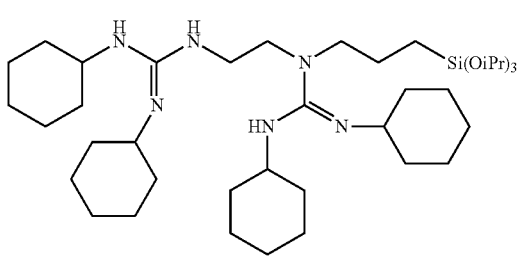
(51)

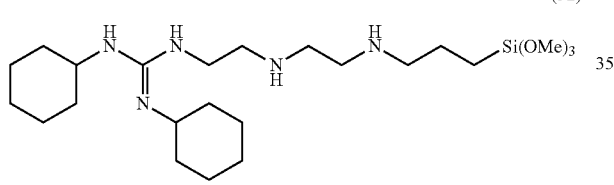
(52)

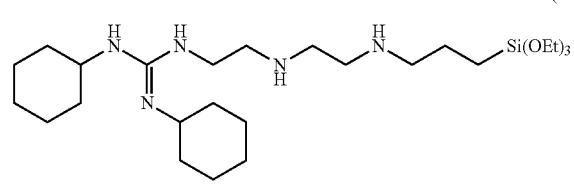
(53)

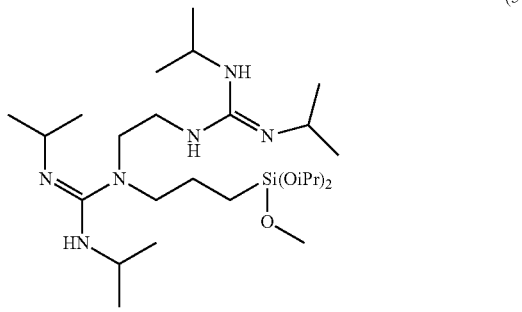
(54)

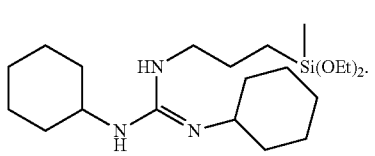
(55)

16. A method for applying an antifouling coating to a support intended to be employed in aquatic uses, said method comprising:

a) optionally, the application of at least one primer coat to said support comprising at least one anticorrosive product, b) optionally, the application of at least one intermediate primer coat promoting adhesion between the coats and curing of said primer coat, c) the application of a tie coat to said primer coat or to said support when the primer coat is absent, d) the curing of said tie coat, e) the application of an antifouling coat, and f) the curing of said antifouling coat, wherein the antifouling coat and/or the tie coat, when present, is/are prepared from a curable polyorganosiloxane composition R which comprises, firstly, a silicone base B capable of curing by means of a polycondensation reaction so as to give a silicone elastomer and, secondly, a catalytically effective amount of at least one polycondensation catalyst A which is selected from the group consisting of

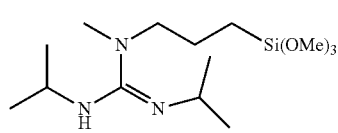
(7)

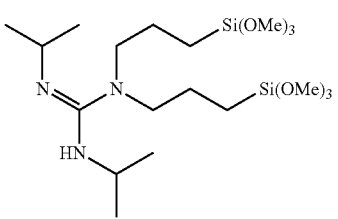
(19)

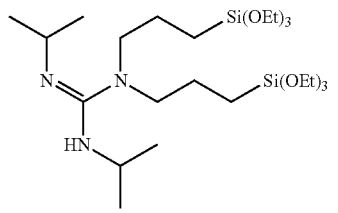
(20)

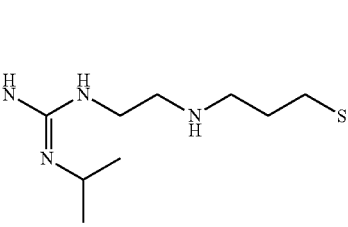
(21)

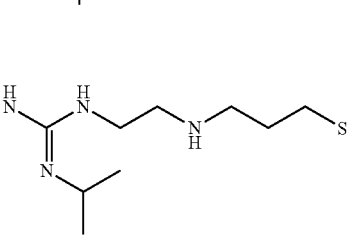
(22)

(23)
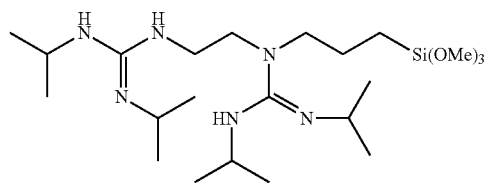
(24)
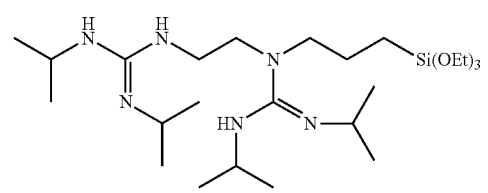
(25)
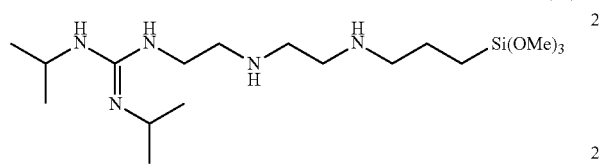
(26)
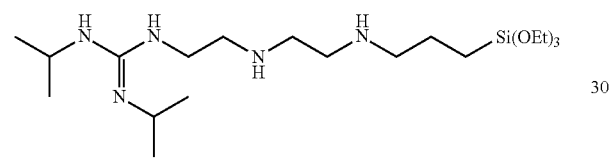
(27)
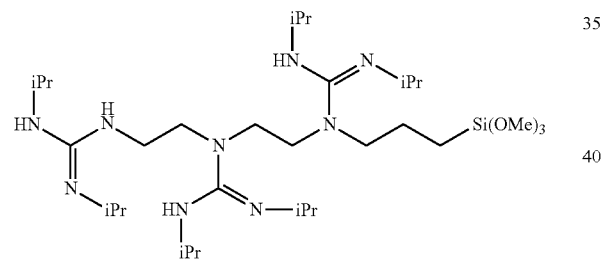
(28)
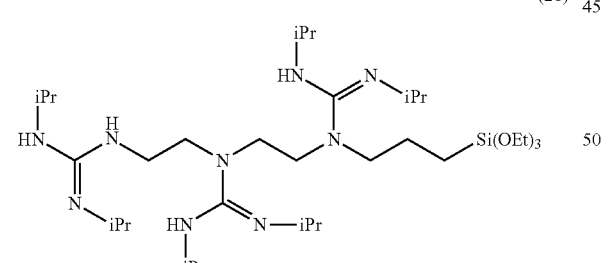
(29)
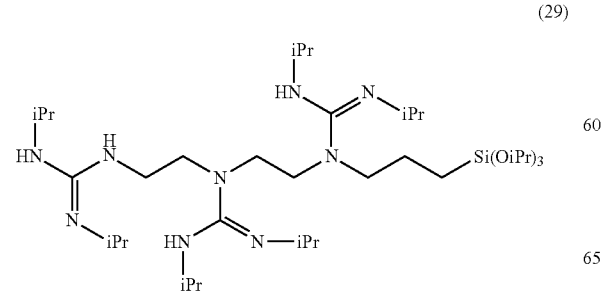
(30)
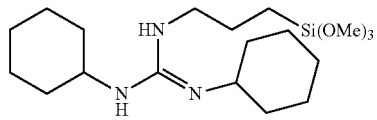
(31)
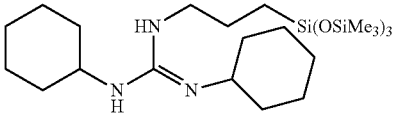
(32)
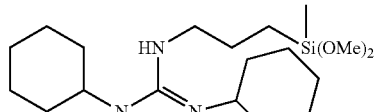
(33)
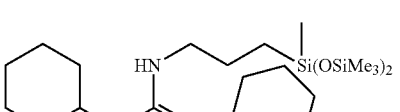
(34)
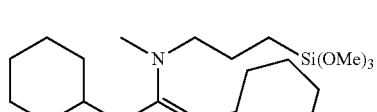
(35)
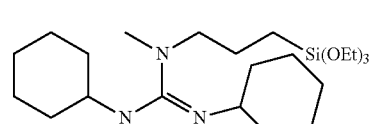
(36)
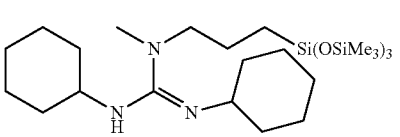
(37)
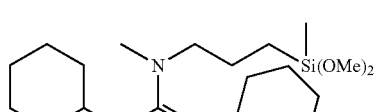
(38)
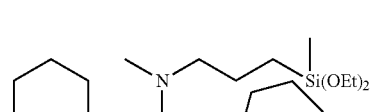
(39)
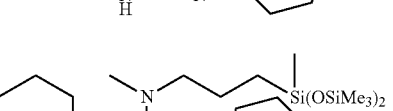
(40)
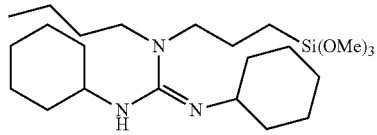

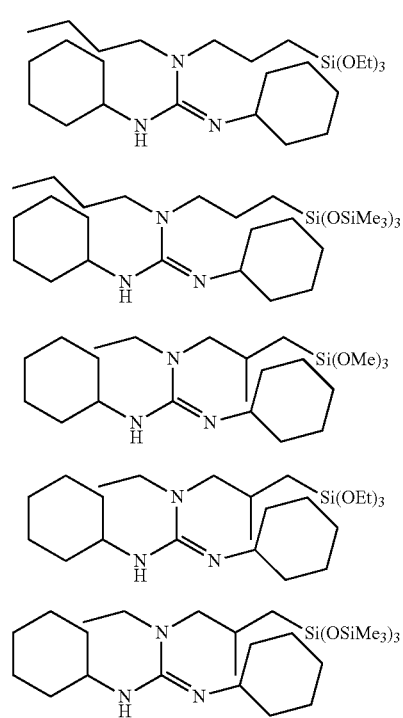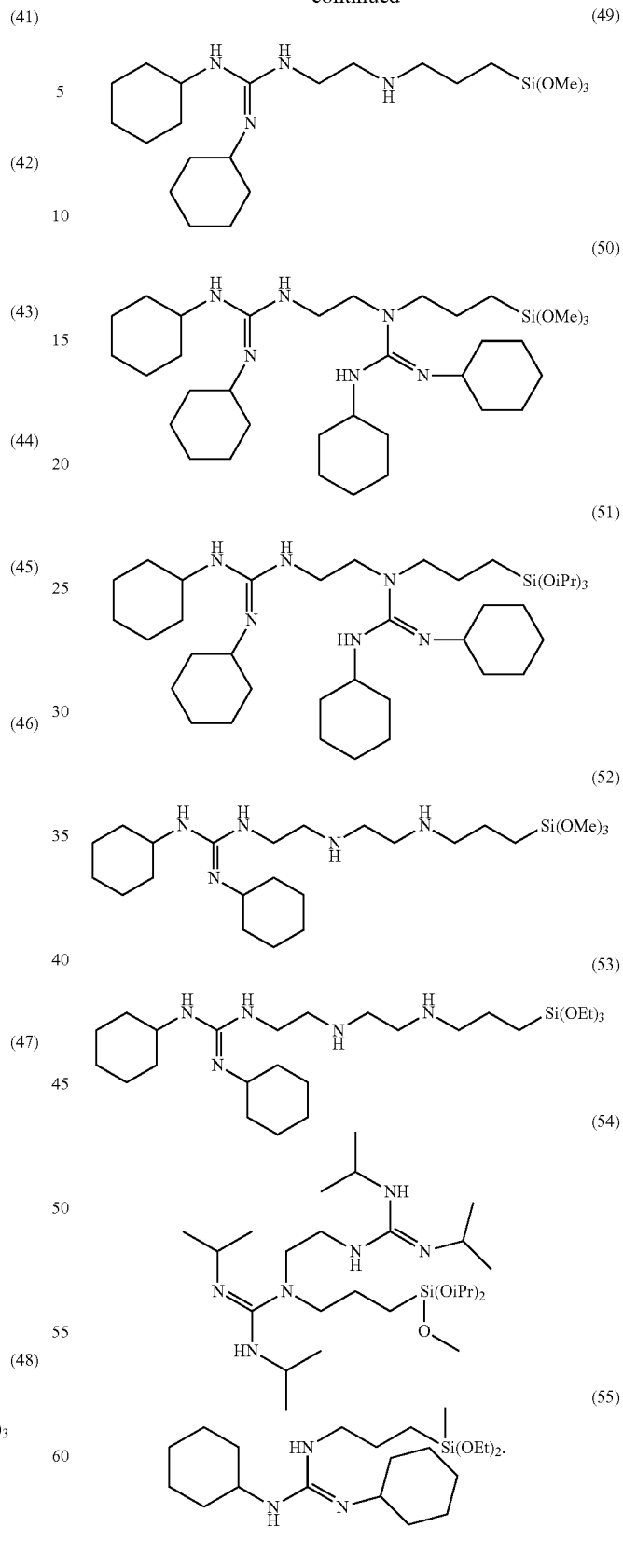
* * * * *